(12) United States Patent
Mendlovic et al.

(10) Patent No.: US 7,012,749 B1
(45) Date of Patent: Mar. 14, 2006

(54) OPTICAL PROCESSING

(75) Inventors: David Mendlovic, Petach-Tikva (IL);
Efraim Goldenberg, Ashdod (IL);
Naim Konforti, Holon (IL); Zeev Zalevsky, Rosh-Haayin (IL); Aviram Sariel, Ramot-Hashavim (IL)

(73) Assignee: Lenslet Ltd., Herzelia Pituach (IL)

( * ) Notice: Subject to any disclaimer, the term of this patent is extended or adjusted under 35 U.S.C. 154(b) by 0 days.

(21) Appl. No.: 09/979,180

(22) PCT Filed: May 19, 2000

(86) PCT No.: PCT/IL00/00285

§ 371 (c)(1),
(2), (4) Date: Feb. 25, 2002

(87) PCT Pub. No.: WO00/72107

PCT Pub. Date: Nov. 30, 2000

Related U.S. Application Data

(63) Continuation-in-part of application No. PCT/IL99/00479, filed on Sep. 5, 1999.

(30) Foreign Application Priority Data

May 19, 1999 (IL) .................................................. 130038
Jul. 25, 1999 (IL) .................................................. 131094

(51) Int. Cl.
*G02B 27/46* (2006.01)

(52) U.S. Cl. ........................ 359/560; 359/559; 382/250; 348/59

(58) Field of Classification Search ......... 359/559–561; 382/250; 345/6; 348/59
See application file for complete search history.

(56) References Cited

U.S. PATENT DOCUMENTS

| 3,969,699 A | 7/1976 | McGlaughlin |
| 4,005,385 A | 1/1977 | Joynson et al. |
| 4,354,247 A | 10/1982 | Yao |
| 4,460,969 A | 7/1984 | Chen et al. |
| 4,590,608 A | 5/1986 | Chen et al. |

(Continued)

FOREIGN PATENT DOCUMENTS

| EP | 0 577 258 | 1/1994 |
| JP | 57-10123 | 1/1982 |
| JP | 2-120917 | 5/1990 |
| JP | 2-127625 | 5/1990 |
| JP | 05-333398 | 12/1993 |
| JP | 7-143484 | 6/1995 |
| JP | 08-129197 | 5/1996 |

OTHER PUBLICATIONS

K.W. Wong et al., "Optical cosine transform using microlens array and phase–conjugate mirror", Jpn. J. Appl. Phys., vol. 31 (1992), pp. 1672–1676.*

(Continued)

*Primary Examiner*—Leo Boutsikaris
(74) *Attorney, Agent, or Firm*—Fenster & Company

(57) ABSTRACT

A method of performing a DFT (discrete Fourier transform) or a DFT derived transform on data, comprising: providing spatially modulated light having spatial coherence, said spatially modulated light representing the data to be transformed; Fourier transforming said spatially modulated light, using an at least one optical element; and compensating for at least one of a scaling effect and a dispersion effect of said at least one optical element, using an at least one dispersive optical element.

6 Claims, 16 Drawing Sheets

U.S. PATENT DOCUMENTS

| | | | |
|---|---|---|---|
| 4,603,398 | A | 7/1986 | Bocker et al. |
| 4,607,344 | A | 8/1986 | Athale et al. |
| 4,615,619 | A | 10/1986 | Fateley |
| 4,697,247 | A | 9/1987 | Grinberg et al. |
| 4,809,204 | A | 2/1989 | Dagenais et al. |
| 4,847,796 | A | 7/1989 | Aleksoff et al. |
| 4,892,370 | A | 1/1990 | Lee |
| 4,892,408 | A | 1/1990 | Pernick et al. |
| 4,972,498 | A | 11/1990 | Leib |
| 4,986,640 | A | 1/1991 | Athale |
| 5,005,954 | A | 4/1991 | Liu |
| 5,072,314 | A | 12/1991 | Cheng |
| 5,080,464 | A | 1/1992 | Toyoda |
| 5,099,448 | A | 3/1992 | Myers et al. |
| 5,107,351 | A | 4/1992 | Leib et al. |
| 5,216,529 | A | 6/1993 | Paek et al. |
| 5,227,886 | A | 7/1993 | Efron et al. |
| 5,235,439 | A | 8/1993 | Stoll |
| 5,262,979 | A | 11/1993 | Chao |
| 5,274,716 | A | 12/1993 | Mitsuoka et al. |
| 5,297,068 | A | 3/1994 | Guilfoyle et al. |
| 5,321,639 | A | 6/1994 | Krishnamoorthy et al. |
| 5,327,286 | A | 7/1994 | Sampsell et al. |
| 5,333,117 | A | 7/1994 | Ha et al. |
| 5,339,305 | A | 8/1994 | Curtis et al. |
| 5,454,047 | A | 9/1995 | Chang et al. |
| 5,537,492 | A | 7/1996 | Nakajima et al. |
| 5,675,670 | A | 10/1997 | Koide |
| 5,784,309 | A | 7/1998 | Budil |
| 5,790,686 | A | 8/1998 | Koc et al. |
| 6,178,020 | B1 | 1/2001 | Schultz et al. |
| 6,535,629 | B1 * | 3/2003 | McCormick et al. ........ 382/154 |

OTHER PUBLICATIONS

Akitoshi, Y. et al.; "Optical Computing Techniques for Image/Video Compression;" Proceedings of the IEEE; US; New York; vol. 82; No. 6; pp. 948–954; XP000438344.

Armand, A. et al.; "Real–Time Parallel Optical Analog–to–Digital Conversion;" Mar. 1980; Optics Letters; vol. 5; No. 3.

Brenner, K.H. et al.; "Implementation of an Optical Crossbar Network Based on Directional Switches;" May 10, 1992; Applied Optics; vol. 31; No. 14; pp. 2446–2451.

Cheng, L. M. et al.; "Optical Cosine Transform Using Phase Conjugation Technique;" Sep. 16–18, 1991; Proceedings of Third International Conference on Holographic Systems, Components and Applications; Organized by Electronics Division of the Institution of Electrical Engineers; pp. 113–117.

Fukui, M. et al.; "High–Throughput Optical Image Crossbar Switch that Uses a Point Light Source Array;" Mar. 1, 1993; Optics Letters, vol. 18; No. 5; pp. 376–378.

Gonzalez, R. C. et al.; "Digital Image Processing;" 1992; Addison Wesley Publishing Company; pp. 84–119, 142–145, and 374–381; ISBN 0–201–50803–6.

Goodman, J. W. et al; "Fully Parallel, High–Speed Icoherent Optical Method for Performing Discrete Fourier, Transforms;" Jan. 1978; Optics Letters; vol. 2; No. 1; pp. 1–3.

Gourlay, J. et al.; "Hadamard Transform Image Processing and Its Optical Implementation with Ferroelectric Liquid Crystal Spatial Light Modulators;" Jan./Feb. 1995; International Journal of Optoelectronics (Incl. Optical Computing & Processing); GB; Taylor & Francis; London; vol. 10; No. 1; pp. 51–58; XP000582638.

Hamanaka, K. et al.; "Multiple Imaging and Multiple Fourier Transformation Using Planar Microlens Arrays;" Oct. 1, 1990; Applied Optics; vol. 29; No. 28; pp. 4064–4070.

Harmuth, H.F.; "Sequency Theory—Foundations and Applications;" 1997; Academic Press; pp. 1–85, 88–97, 102–107 and 110–121.

Lee, J. N.; "Acousto–Optic Techniques for Information Processing Systems;" Oct. 14–16, 1987; IEEE Ultrasonics Symposium; vol. 1; pp. 475–484.

Marom, D. M. et al.; "All–Optical Reduced State 4x4 Switch;" Mar. 1996; Optics and Photonics News; p. 43; column 3.

Wang, N. et al.; "Cantor Network, Control Algorithm, Two–Dimensional Compact Structure and its Optical Implementation;" Dec. 10, 1995; Applied Optics; vol. 34; No. 35; pp. 8176–8182.

Wu, Y. et al.; "Optical Crossbar Elements Used for Switching Networks;" Jan. 10, 1994; Applied Optics; vol. 33; No. 2; pp. 175–178.

Yu, F. T. S. et al.; "Optical Signal Processing, Computing, and Neural Networks;" 1992; John Wiley & Sons, Inc.; Sections 8.7 and 8.8; pp. 308–319 and 326–329.

Akiba, A. et al.; "Fundamental Study on a Microoptic Image Preprocessor Composed of Planar Microlens Array;" Aug. 1991; Journal: Optics; vol. 20; No. 8; pp. 507–513.

Cohen, R.W.; Link Analysis of a Deformable Mirror Device Based Optical Crossbar Switch; Jan. 1992; Optical Engineering; vol. 31; No. 1; pp. 134–140.

Farr, K.B. et al.; "Lens Design for a White–Light Cosine–Transform Achromat;" Jan. 1, 1995; Applied Optics; vol. 34; No. 1; pp. 128–137.

Feitelson, D.; "Optical Computing;" Chapter "Optical Image and Signal Processing;" MIT Press 1988; pp. 102–104, 110–111, 117–131 and 184–189.

Fukui, M.; "Optoelectronic Parallel Computing System with Optical Image Crossbar Switch;" Nov. 10, 1993; Applied Optics; vol. 32; No. 32; pp. 6475–6481.

George, N. et al.; "Cosinusoidal Transforms in White Light;" Mar. 15, 1984; Applied Optics; vol. 23; No. 6; pp. 787–797.

Goutin, P. et al.; "Some New Result in Hybrid Acousto–Optic Processing;" Oct. 1992; Proceedings of the IEEE Ultrasonics Symposium; vol. 1; pp. 493–496.

Kirk, A. G. et al.; "Experimental Implementation of an Optoelectronic Matrix–Matrix Multiplier which Incorporates Holographic Multiple Imaging;" Dec. 1992; Optical Computing and Processing; vol. 2; No. 4; pp. 293–304; XP361747.

Koc, U. et al.; "DCT–Based Motion Estimation;" Jul. 1998; IEEE Transactions on Image Processing; vol. 7; No. 7; pp. 948–965.

Koc, U.; "Low Complexity and High Throughput Fully DCT–Based Motion Compensated Video Coders;"presented in 1996 to Ray Liu, K.J. of the Institute for Systems Research; University of Maryland; Harvard University and Industry.

Marom, D. M. et al.; "Compact All–Optical Bypass–Exchange Switch;" Jan. 10, 1996; Applied Optics; vol. 35; No. 2; pp. 248–253.

Nomura, K. et al.; "Hartley Transformation for Hybrid Pattern Matching;" Oct. 10, 1990; Applied Optics; vol. 29; No. 29; pp. 4345–4350.

Rao, K. R. et al.; "Decimation–in–Time (DIT) and Decimation–in–Frequency (DIF) Algorithms;" 1990; DCT–Algorithms, Advantages Applications; Chapter 4.4; Academic Press Inc.; pp. 56–61.

Stone, T. W. et al.; "Optical Array Generation and Interconnection Using Birefringent Slabs;" Jan. 10, 1994; Applied Optics; vol. 33; No. 2; pp. 182–191.

Yatagai, T.; "Optical Computing in Japan;" Oct. 1998; Future Generation Computer Systems; vol. 4; No. 3; pp. 177–187; XP000111373.

"Performance of 4 x 4 Optical Crossbar Switch Utilizing Acousto–Optic Deflector;" Feb. 16, 1989; Electronics Letters; vol. 25; No. 4; pp. 252–253.

Hong, X. H. et al.; "Fast Parallel Complex Discrete Fourier Transforms Using a Multichannel Optical Correlator;" Optics Communications; vol. 68; No. 6; Nov. 15, 1988; pp. 408–411; XP000006236.

Inbar, H. et al.; "Modfied Joint Transorm Correlator Binarized by Error Diffusion Spatially Variant Range Limit;" Applied Optics; vol. 33; No. 20; Jul. 10, 1994; pp. 4444–4451; XP000455183.

Glaser, I.; "Noncoherent Parallel Optical Processor for Discrete Two–Dimensional Linear Transformations;" Oct. 1980; Optics Letters; vol. 5; No. 10; pp. 449–451.

Wong, K. W. et al.; "Optical Cosine Transform Using Microlens Array and Phase–Conjugate Mirror;" May 1992; Japanese Journal of Applied Physics; vol. 31; pp. 1672–1676.

Eckert, W. et al.; "Compact Planar–Integrated Optical Correlator for Spatially Incoherent Signals;" Applied Optics; vol. 39; No. 5; Feb. 10, 2000.

Caulfield, H.J. et al.; "Optical Computing: the Coming Revolution in Optical Signal Processing;" Laser Focus/Electro–Optics; pp. 100–110; Circle No. 75; Nov. 1983.

Eckert, W. et al.; "Design and Fabrication of a Compact Planar–Integrated Optical Correlator;" Conference Proceeding of the IEEE Lasers and Electro–Optics Society's $10^{th}$ Annual Meeting, LEOS'97; vol. 1.; Nov. 10–13, 1997; pp. 134–135.

Psaltis, D. et al.; "High Accuracy Computation with Linear Analog Optical Systems: a Critical Study;" Applied Optics; vol. 25; No. 18; pp. 3071–3077; Sep. 15, 1986.

* cited by examiner

OPTICAL PROCESSING

RELATED APPLICATIONS

This application is a U.S. national filing of PCT Application No. PCT/IL00/00285, filed May 19, 2000. This application is also a continuation in part of PCT application PCT/IL99/00479, filed Sep. 5, 1999, designating the U.S., the disclosure of which is incorporated herein by reference.

FIELD OF THE INVENTION

The present invention relates to the field of optical processing and, in some embodiments, to compressing images using optical components.

BACKGROUND OF THE INVENTION

Often, the information bandwidth to be transmitted is greater than the available bandwidth. Therefore, information is often compressed before it is transmitted (or stored), to reduce the required bandwidth. For example, the HDTV standard was defined, at its inception, to include compression. Many types of signals are compressed, including still images, video and telephone conversations. The reigning compression standards are JPEG for still images and MPEG (I, II, III or IV) for video. In actuality, these standards are standards for the compressed signals. There is no particular requirements, in the standard, on the method for converting the uncompressed signals into compressed signals.

Compression and in some cases decompression are often very demanding and typically require dedicated hardware. Both JPEG and MPEG are transform-based methods, in which the uncompressed data is transformed into a transform space, where the data is represented by a set of coefficients. It is usually desirable that the coefficients have less autocorrelation than the image data or even no autocorrelation at all. Although the DCT transform does not completely decorrelate the coefficients, the correlation between them is significantly reduced. In other compression methods, other transform spaces are used. In transform space, some of the coefficients have a greater visual and/or other effect on the image, than other coefficients. To obtain compression, the coefficients are quantized, with fewer bits being allocated to those coefficients which have a lesser effect. Typically, a coefficient is quantized by dividing it by a weight and then rounding or truncating the result.

Optical and electro-optical processors have been used in the art, to a small extent, for computationally demanding applications. However, with the advent of very fast electronic computer components and parallel processors, their acceptance has been limited.

Performing some types of linear transforms, for example Fourier transforms, continuous cosine transforms and Walash transforms, using optical components is known, for example, as described in "Cosinusoidal Transforms in White Light", by N. George and S. Wang, in *Applied Optics*, Vol. 23, No. 6, Mar. 15, 1984, in "Hartley Transforms for Hybrid Pattern Matching", by Nomura, K. Itoh and Y. Ichioka, in *Applied Optics*, Vol. 29, No. 29, Oct., 10, 1990, in "Lens Design for a White-Light Cosine-Transform Achromat", by K. B. Farr and S. Wang, in Applied Optics, Vol. 34, No. 1, Jan. 1, 1995 and in "Optical Computing", by D. Feitelson, in a chapter titled "Optical Image and Signal Processing", pp. 102–104 (which pages describe general discrete linear transforms using a lenslet array), and pp. 117–129 (which describe matrix multiplication), MIT Press 1988, the disclosures of which are incorporated herein by reference.

SUMMARY OF THE INVENTION

An aspect of some embodiments of the invention relates to optical processing architectures. Exemplary architectures are used for general linear transforms, BLOCK transforms, wavelet transforms, such as the S transform, S+P transform family, other integer to integer "wavelet-like" transforms, or general known wavelet transform (Daubechies etc.) useful for wavelet compression, DCT transforms, communication signal processing, and/or image compression and/or decompression. In some embodiments, pure optical systems are provided. In other embodiments, hybrid optical and electronic systems are provided.

An optical processing system in accordance with an exemplary embodiment of the invention optionally comprises five stages, an input which receives the data to be processed, an optional preprocessing stage which converts the representation of the data into a presentation more suitable for processing, a processing stage which performs the processing, an optional post processing stage which converts the representation of the processed data into one suitable for output and an output stage which outputs the data. In an exemplary embodiment of the invention, some or all of the stages are optical. In some embodiments, one or more electronic or hybrid electronic and optical stages may be used, for example for pre-processing the data. Additionally, in some embodiments, only some of the processing is performed optically, with the balance of the processing optionally being performed electronically.

An aspect of some embodiments of the invention relates to optical block transforms, especially of image data. In an exemplary embodiment of the invention, an optical component is used to transform image data in blocks, with each block being transformed separately. In an exemplary embodiment of the invention, the transform used is a DCT (Discrete Cosine Transform) transform, optionally a JPEG-DCT, which is the DCT transform variant used for JPEG. Optionally, the block size is 8×8, which is a standard block size for many applications. Alternatively, different block sizes may be used, for example 16×16 or 64×64, possibly with different block sizes and/or block aspect ratios for different parts of the image. For wavelet transforms, larger blocks are optionally used.

An aspect of some embodiments of the invention relates to performing a DCT (Discrete Cosine Transform) using optical processing, optionally a JPEG-DCT. In an exemplary embodiment of the invention, a single optical element is used to transform data from an image domain to a DCT domain. A related aspect is an optical element which performs discrete wavelet and "integer to integer" wavelet transforms (such as the S and S+P transforms), for example using a combination of diffraction gratings neutral density filters (for weighting sums and differences).

An aspect of some embodiments of the invention relates to a block-DCT-transforming lens, optionally a JPEG-DCT performing lens. In an exemplary embodiment of the invention, such a lens comprises a two dimensional matrix of groups of optical elements, each such group performing a DCT on a single block. Optionally, such a group comprises a lenslet array which performs the DCT directly. Alternatively, the matrix comprises a matrix of optical elements, with each optical element performing a DCT transform for a single block. Alternatively to performing a DCT transform, a correspondence between JPEG DCT and DFT (Discrete Fourier Transform) may be utilized, so that a Fourier-transforming lens (or optical element or lenslet array) is used. Optionally, optical or electrical components are provided to modify the data and/or the transformed data so that the Fourier lens generate a DCT transform, at least for real image data. Alternatively to block-DCT lens, a lens for performing other types of block transforms, such as a block-Wavelet-transform, can be provided.

An aspect of some embodiments of the invention relates to performing optical motion estimation. In an exemplary embodiment of the invention, the motion estimation is performed on block-DCT-transformed data, by comparing DCT coefficients of neighboring blocks. Optionally the same hardware is used to perform DCT for motion estimation and for image compression. Alternatively or additionally to motion estimation, motion compensation may also be performed by correcting DCT coefficients of transformed data.

An aspect of some embodiments of the invention relates to data compression using optical components. In various exemplary embodiments of the invention, individual steps of image compression methods are performed using optical components. In some embodiments of the invention, multiple sequential steps are implemented using optical components, possibly without conversion back to electrical signals in-between steps.

In an exemplary embodiment of the invention, the data compressed is image data. Optionally, compression method is a transform based method, especially a DCT based method, such as JPEG or MPEG. Alternatively or additionally, other types of data compression which require processing (not spatial zooming) may be used, for example, entropy encoding. In an exemplary embodiment of the invention, at least the DCT and/or motion estimation steps used for the above compression methods are performed optically. Alternatively, the compression method is a wavelet based compression method.

Alternatively or additionally to compression, data decompression may be effected using optical processing, for example to perform an inverse DCT.

An aspect of some embodiments of the invention relates to direct acquisition of images which are compressed, partially compressed, pre-processed for rapid compression and/ or otherwise processed. In an exemplary embodiment of the invention, a camera uses a DCT-transforming lens, which receives light from an imaged object and projects a transform of the light onto an optical detector, such as a CCD, for data acquisition. Alternatively, other types of optical detectors, such as a CMOS detector may be used. Optionally, but not necessarily, other optical elements are provided between the DCT lens and the CCD to perform further optical processing and/or image compression on the data. Alternatively or additionally, optical and/or electro-optical elements are provided between the object and the DCT lens to perform pre-processing on the optical data, for example to change its data representation scheme, or to better process polychromatic light. In an exemplary embodiment of the invention, the DCT lens accepts polychromatic light. Alternatively, color information is separated out of the light received from the imaged object and the DCT lens accepts monochromatic light. In an exemplary embodiment of the invention, the optical processing is use to perform or aid in performing JPEG or MPEG compression. Alternatively or additionally, other compression protocols are performed. Alternatively to DCT lens, other block-transform lens may be provided, for example for an S-transform.

An aspect of some preferred embodiments of the invention relates to using a continuous Fourier-transform optical system, for example a Fourier lens, for performing a discrete transform, for example a Fourier based transform such as a DCT transform. In a preferred embodiment of the invention, data to the Fourier lens is matched to a data receptor at the other side of the Fourier lens to allow a discrete transform to be performed.

An aspect of some embodiments of the invention relates to applying Fourier based transforms, such as a DCT transform using incoherent light systems. In some embodiments of the invention, a combination of dispersive element such that the one compensates for the other can be used. For example, a pair of conjugate zone plates are used to effect a Fourier transform, by providing a dispersive effect and correcting for the wavelength scaling. Alternatively, a zone plate combined with a suitable lens is provided. In an exemplary embodiment of the invention, one or more arrays of conjugate zone plates are provided in order to create a multi-channel system. Potential advantages of using incoherent light include (a) allowing direct processing of an incoming image; (b) reducing speckle effects; (c) allowing the light to always be real and non-negative, with the detected signal representing intensity, which may be more appropriate to cosine transform applications and to square-law detection devices; and/or (d) reducing complexity, since incoherent optical systems are often less sensitive to deformation of the components, such as the flatness of the spatial light modulator.

An aspect of some embodiments of the invention relates to using one or more reflective elements in an image processor, for example to reduce an optical path. In a processor comprising generally a source, SLM and processing lens (or other optical element), one or more of the elements may be reflective, rather than transmissive. For example, a reflective source may comprise a source viewed through a pinhole formed in a mirror. Alternatively or additionally, the SLM may be combined with the source to provide a spatially modulated source of any type. In some embodiments of the invention, a mirror may be semi-reflective, in that light impinging on the mirror from one side is reflected and from the other side is transmitted. Alternatively or additionally, the mirror may be a polarizing beam splitter, that selectively reflects light of a certain polarization.

In some embodiments of the invention, two or more of the optical elements are integrated into a single element, for example, the SLM and the lens, the SLM and the detector or the lens and the detector. In one example, the detector is partially reflective (and/or a polarizing beam splitter) and is curved, to act as a lens. A second mirror (optionally polarization affecting) returns the light processed by the lens effect of the detector, to the detector, for detection. In some embodiments, two light beams are thus provided, a processed beam and an unprocessed beam that can be used as a reference beam for various uses.

An aspect of some embodiments of the invention relates to reducing interactions between light from adjacent pixels or pixel groups. In an exemplary embodiment of the invention, one or more of the following separation methods are practiced: frequency separation, spatial separation (optionally with a light absorbing or light redirecting separator between adjacent pixels), polarization axis differences, temporal offset and/or their combinations. Alternatively or additionally, no separation is practiced. In an exemplary embodiment, a plurality of channels are processed using a single lens or other optical element. A prism or other spatially shifting optical element is provided for at least one of the channels, so that the transform effect of the lens is offset for that channel. Then, the effects of channel overlap are calculated or estimated and corrected for.

An aspect of some embodiments of the invention relates to using optical switching technology for transforming data or for otherwise processing data encoded using light waves. Optionally, calcite or other bi-refringent materials are used to split light beams, each original light beam representing a pixel or a part thereof. The split light beams are then added, subtracted and/or multiplied by constants to perform the required calculations (such as a DCT transform or a DWT transform), with the end result of the addition and subtraction being light waves encoding the transformed data. Alternatively to calcite, diffractive or refractive optical elements may be used to split the beams of light.

There is thus provided in accordance with an exemplary embodiment of the invention, a method of performing a DFT (discrete Fourier transform) or a DFT derived transform on data, comprising:

providing spatially modulated light having spatial coherence, said spatially modulated light representing the data to be transformed;

Fourier transforming said spatially modulated light, using an at least one optical element; and compensating for at least one of a scaling effect and a dispersion effect of said at least one optical element, using an at least one dispersive optical element. Optionally, said spatially modulated light is substantially temporally incoherent. Alternatively, said spatially modulated light is non-monochromatic light.

In an exemplary embodiment of the invention, said spatially modulated light is a multi-wavelength light including at least one wavelength gap.

In an exemplary embodiment of the invention, said data is mirrored and replicated in said modulated light. Alternatively or additionally, said at least one dispersive element comprises a zone plate.

In an exemplary embodiment of the invention, said at least one dispersive optical element comprises a zone plate array. Alternatively or additionally, said at least one optical element comprises a phase conjugate plate.

Alternatively or additionally, said at least one optical element comprises a dispersive lens. Alternatively or additionally, said transformed light encodes a DCT transform of said data.

In an exemplary embodiment of the invention, the method comprises spatially modulating light from a light source using an SLM (spatial light modulator) to produce said spatially modulated light. Alternatively or additionally, the method comprises detecting said transformed light using a detector array. Alternatively or additionally, said transform is a block transform.

There is also provided in accordance with an exemplary embodiment of the invention, apparatus for performing a DFT (discrete Fourier transform) or a discrete Fourier derived transform, comprising:

at least one reflective element;

a detector array; and a spatially modulated light source, wherein said reflective element, said detector and said source are arranged so that light from said spatially modulated light source is reflected from said mirror to be focused on said array. Optionally, said apparatus comprises a lens to focus said light. Alternatively, said at least one reflective element comprises a curved mirror that focuses said light.

In an exemplary embodiment of the invention, said at least one reflective element is partially transparent and wherein said spatially modulated light source comprises a primary light source on an opposite side of said mirror from said detector array. Optionally, said spatially modulated light source comprises an SLM (spatial light modulator) between said at least one reflective element and said primary light source. Alternatively or additionally, said detector array is integrated with a reflective SLM (spatial light modulator).

There is also provided in accordance with an exemplary embodiment of the invention, a combined detector and spatial modulator apparatus, comprising:

a plurality of detector elements; and a plurality of light modulating elements interspersed with said detector elements. Optionally, all of said elements are formed on a single substrate. Alternatively or additionally, said light modulating elements are reflective.

There is also provided in accordance with an exemplary embodiment of the invention, apparatus for performing a DFT (discrete Fourier transform) or a discrete Fourier derived transform, comprising:

a detector array having formed therein at least one pinhole;

a light source on one side of said array;

at least one processing element; and an SLM (spatial light modulator) on an opposite side of said array from said light source, wherein said array, source, processing element and SLM are so positioned and arranged that light from said light source passes through said pinhole and is modulated by said SLM before being processed by said processing element and impinging on said detector. Optionally, said SLM is reflective.

There is also provided in accordance with an exemplary embodiment of the invention, a method of separating channels in a multi-channel optical system, comprising:

optically processing a plurality of adjacent channels using a common optical element to have overlapping output areas;

detecting a result of said processing on an image plane; and deriving the processing of a single channel of said plurality of channels by subtracting an effect of the overlapping channels. Optionally, said optical element comprises a lens. Alternatively or additionally, said plurality of adjacent channels comprises a set of 3×3 channels.

In an exemplary embodiment of the invention, the method comprises a plurality of spatially shifting elements associated With at least some of said channels, to spatially shift said detected result on said detector plane. Optionally, said plurality of spatially shifting element comprise a plurality of prisms. Optionally, a prism is not associated with a central channel in a spatial arrangement of said plurality of channels.

BRIEF DESCRIPTION OF THE DRAWINGS

The present invention will be more clearly understood from the following detailed description of some embodiments of the invention and from the attached drawings, in which.

DETAILED DESCRIPTION OF SOME EMBODIMENTS

Figure 1:
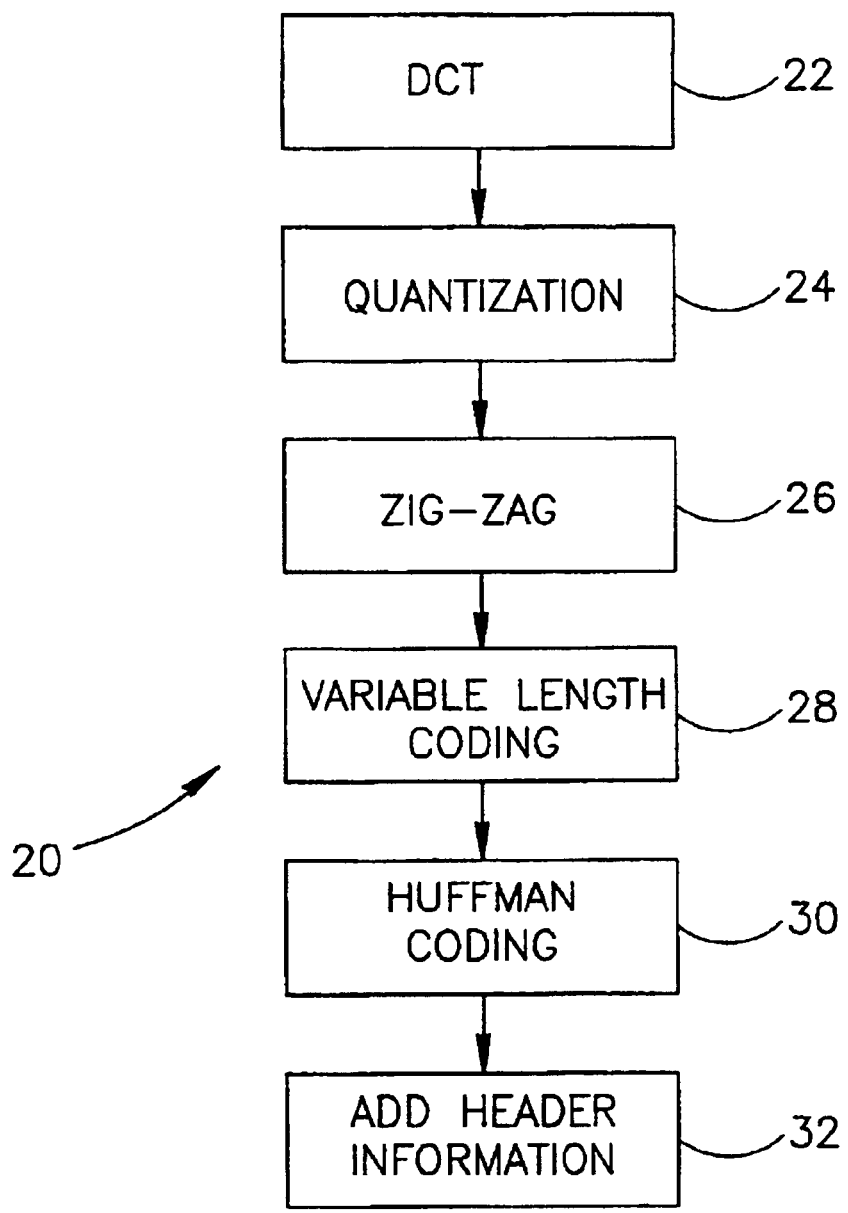
FIG. 1 is a flowchart of a baseline method of JPEG-compliant compression.

FIG. 1 is a flowchart of a base-line method 20 of JPEG-compliant compression. Image data is first transformed using the DCT (Discrete Cosine Transform) (22), to generate a set of coefficients. These coefficients are then quantized (24). The quantized coefficients are then unfolded from a 8×8 representation to a 64×1 representation ("Zig-Zag", 26). These quantized coefficients are encoded using a variable-length encoding scheme (28), zero-run length encoded and then Huffman encoded (30), to reduce entropy. A compressed data file is then generated by prefixing the encoded data with header information (32). Other, similar, methods of JPEG compression are also known.

In accordance with an exemplary embodiment of the invention, various of the above steps are performed using optical elements, rather than using electronic or software elements. In the above described JPEG compression method, the step that is typically most computationally demanding, is the DCT step. Thus, in an exemplary embodiment of the invention, the DCT step is performed optically.

Figure 2:
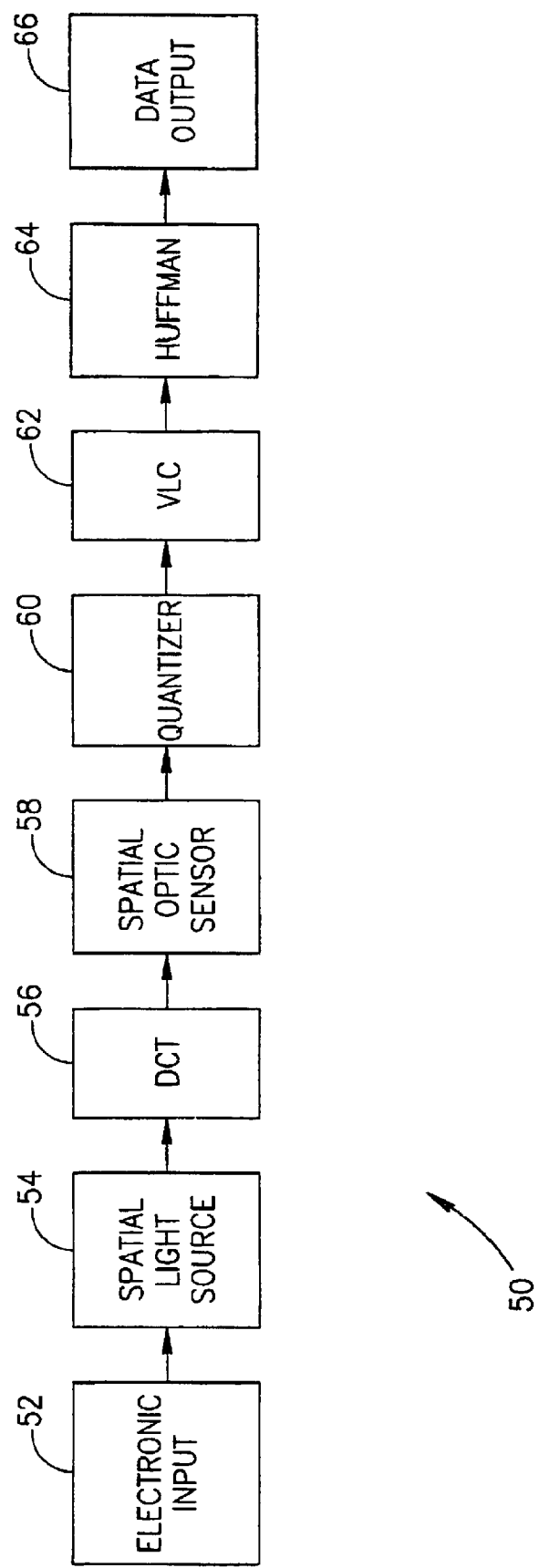
FIG. 2 is a schematic block diagram of an optical JPEG compression system, in accordance with an exemplary embodiment of the invention.

FIG. 2 is a schematic block diagram of an optical JPEG compression system 50, in accordance with an exemplary embodiment of the invention. An electronic input 52 is optionally used to receive the data to be compressed. This element will generally depend on the application for which system 50 is used. For example, if system 50 is implemented on a PC card, electronic input 52 will generally comprises a PC-compatible bus connector. The acquired data is then converted into light, using a spatial light source 54. In an exemplary embodiment of the invention, light source 54 comprises an SLM (Spatial Light Modulator) which modulates a beam of light that is reflected from it or that is transmitted through it. Alternatively, source 54 may comprise an array of LEDs, laser diodes, VCELs (vertical cavity emission lasers) or other types of pixelated display devices such as CRT, field effect emitter arrays and plasma displays.

The type of light emitted by source 54 is optionally selected to match an optical DCT unit 56. In some embodiments of the invention, the light from source 54 is coherent (so a laser source is optionally used). In other embodiments, the optics do not require coherent light. In an exemplary embodiment of the invention, the light is optionally monochromatic. Alternatively, polychromatic light may be used. In some particular exemplary embodiments of the invention, multiple frequencies of monochromatic light are used, for example wherein the frequencies are used to encode attributes of the data, such as its numerical sign. In an exemplary embodiment of the invention, the data is encoded using an analog encoding scheme, for example phase or amplitude. Alternatively, a digital encoding scheme is used. Possibly, as described below, the light may be AID converted from analog-encoding light into digital-encoding light, for example after it is transformed.

Optical DCT unit 56 transforms the light from an image space to a transform space. Optionally, the transformed light is projected unto a spatial optical sensor 58, such as a CCD array. Details of various types of DCT unit 56 and methods of construction thereof are provided below.

Data is read out of CCD array 58 and then it is quantized, using a quantizer 60. In an exemplary embodiment of the invention, the quantization may be performed by setting gain and/or offset characteristic of the CCD and/or individual elements thereof and/or controlling the readout of the CCD, for example to provide a reduced bit-per-pixel ratio. Alternatively, the data is quantized as it is read off the CCD or after it is read off the CCD. Alternatively or additionally, the data is quantized by optical means, such as a second SLM in front of the CCD. The unfolding of the data may be performed before the quantizing or after the quantizing. Then, the data is encoded using a variable length encoding unit 62, Huffman-encoded using a Huffman encoding unit 64 and, finally, a header is attached to the compressed data so that it meets the JPEG standard. Alternatively or additionally, the data is encoded using arithmetic coding (optionally performed by an arithmetic coding unit—not shown).

As will be described below, additional elements of the compression system may be replaced with optical units. In some embodiments of the invention, the different optical units will be interconnected with electrical circuitry, for example for control, data management or data conversion. Thus, even if two consecutive units are embodied using optical means, they may have an intervening step of optical/electrical conversion and then electrical/optical conversion. In other embodiments, the processed light will feed directly from one optical unit to the next. In an exemplary embodiment of the invention, a system includes both optical and electronic components and the processing is divided between the components so they can act in parallel. In one example, some of the transforming may be performed optically and some electronically. Such dividing up of work, can better utilize all the elements in a compression/decompression device, especially if some of the components are dual use, for example DSP components.

Optical DCT unit 56 may be implemented in various ways. It should be noted that when compressing images, the DCT transform applied is in actuality a block-DCT transform, where each part of the image is separately transformed.

Figure 3A:
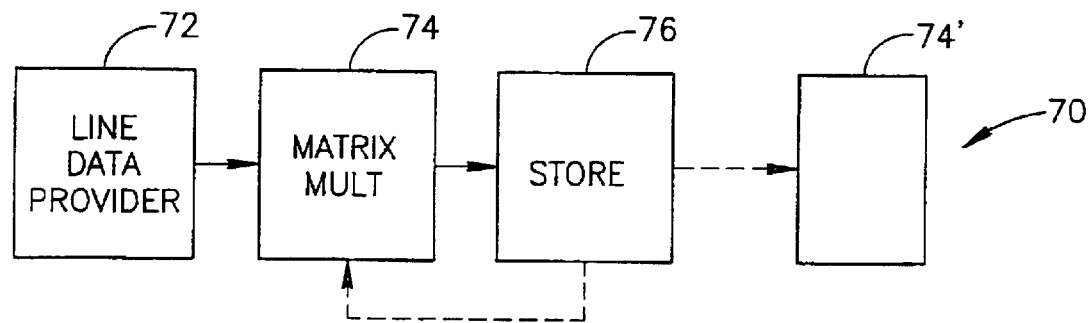
FIG. 3A is a schematic block diagram of a matrix-multiplication based optical DCT component, in accordance with an exemplary embodiment of the invention.

FIG. 3A is a schematic block diagram of a matrix-multiplication based optical DCT component 70, in accordance with an exemplary embodiment of the invention. The DCT transform can be presented in matrix form as [DCT]= [C][T][C]. Matrix by matrix multiplication may be performed in many ways, including using multiple repetitions of vector by matrix multiplication, for example as described in "Introduction to Fourier Optics", Goodman, pp. 286, or using direct matrix by matrix multiplication, for example as described in Feitelson, pp. 126–127 (double or triple products), optionally using monochromatic coherent light, or as described in Feitelson, pp. 118, using lenslet arrays, which can accommodate white light; the disclosure of all of which is incorporated herein by reference, In a vector by matrix embodiment of component 70, a line data provider 72 provides individual lines or columns of an 8×8 block to a matrix multiplier 74. The DCT transform of a vector can be performed by multiplying a source vector V by a convolution matrix C, to obtain a transformed vector T. For each 8×8 block the lines (or the columns) are individually transformed and then the result is transformed along the individual columns (or lines). In an exemplary embodiment of the invention; the data is row transformed using a first unit 74 and is then column transformed using a second multiplication unit 74'. Alternatively, a same unit is used for both the row and column transforms. Optionally, the transformed row data is accumulated using a store unit 76. If each one of the rows is transformed in sequence, the transformed row data may be accumulated using store 76 even if a separate unit 74' is used for column transforms.

Figure 3B:
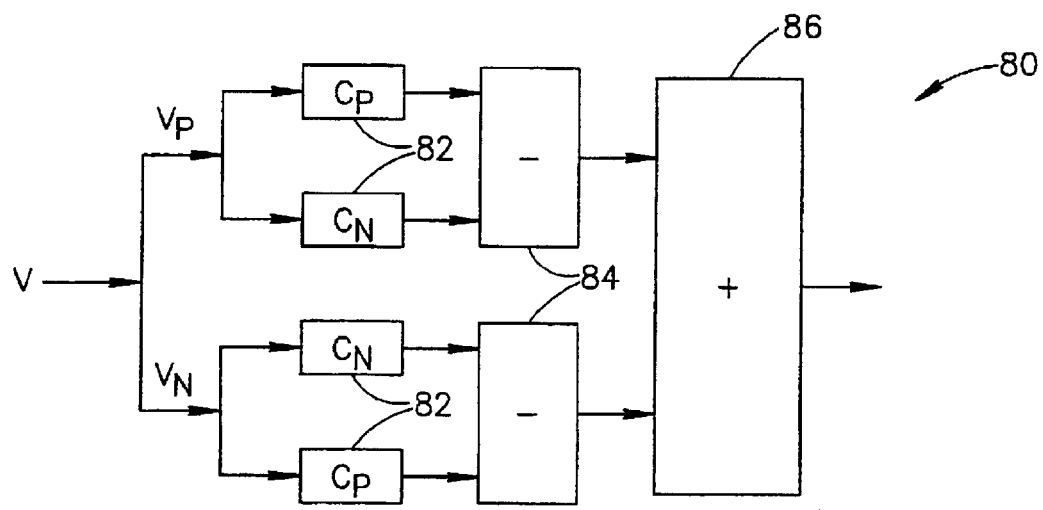
FIG. 3B is a schematic block diagram of an optical matrix by vector multiplication component, in accordance with an exemplary embodiment of the invention.

FIG. 3B is a schematic block diagram of an optical matrix-by-vector multiplication component 80, in accordance with an exemplary embodiment of the invention. When performing a DCT transform, negative-valued results may be produced. Multiplication component 80 separately processes negative- and positive-valued results, to avoid miss-processing. Mathematically, the multiplication of a matrix C by a vector V is a linear operation, so that it can be separated in to negative and positive components, e.g.: $C*V=Cp*Vp+Cn*Vn-Cp*Vn-Cn*Vp$, where the "n" subscript indicates negative numbers and the "p" subscript indicates positive numbers. In the component of FIG. 3B, vector V is separated into positive and negative values, which are each separately multiplied by positive or negative valued component matrixes 82 and then summed using subtractors 84 and an adder 86. In an exemplary embodiment of the invention, four matrix multiplication units 82 are provided. Alternatively, only two or even only one unit 82 is used, for example to sequentially process negative and positive numbers. In general, the source data is all positive, so that the vector Vn is empty. It is noted that the DCT of the original image data, which is positive, may be simpler to implement than the DCT of transformed data, which may be negative.

In an exemplary embodiment of the invention, sign issues are solved using a bipolar number representation. In a bipolar representation, each number is designated by two components: $s=[p,n]$, where s is a general signed number (not necessarily an integer), and $[p,n]$ are its positive and negative components. s is retrieved by setting $s=p-n$. Therefore, the number $-5$ can be described by $[0,5]$, $[3,8]$, $[10,15]$, $[1,6]$ or other combinations of p and n, as long as p, $n>0$, and $p-n=s$.

The generalized bipolar representation can be adapted to matrix calculation, by representing each number by a 2×2 matrix, of the form $[p\ n]$
$[n\ p]$.

For example:

$$\begin{bmatrix}1 & -2\\3 & -4\end{bmatrix}\cdot\begin{bmatrix}1 & -1\\2 & 2\end{bmatrix}=\begin{bmatrix}-3 & -5\\-5 & -11\end{bmatrix}\rightarrow\begin{bmatrix}1 & 0 & 0 & 2\\0 & 1 & 2 & 0\\3 & 0 & 0 & 4\\0 & 3 & 4 & 0\end{bmatrix}\cdot\begin{bmatrix}1 & 0 & 0 & 1\\0 & 1 & 1 & 0\\2 & 0 & 2 & 0\\0 & 2 & 0 & 2\end{bmatrix}=\begin{bmatrix}1 & 4 & 0 & 5\\4 & 1 & 5 & 0\\3 & 8 & 0 & 11\\8 & 3 & 11 & 0\end{bmatrix}$$

This representation can be extended to triple product matrix multiplication.

The [p,n] representation may be implemented using separate optical beams to represent each of the p and n components. Alternatively, a single, multi-characteristic beam may be used to represent both components. In one example, different optical frequencies are used for the different components. Alternatively or additionally, different polarizations are used for the different components. The two components may be separated out after processing, for example one component being diverted (or copied) to a different CCD. Alternatively, a single optical detector detects both components, for example a detector that is sensitive to the difference between the amplitudes in the two frequencies. Such a detector may be implemented by electronically subtracting the output of two adjacent detectors, each detector being sensitive to a different frequency.

Alternatively to the method of FIG. 3B, negative numbers may be dealt with in other ways. In one example, negative and positive numbers are differentiated by their phase. A diffraction grating can be used to divert numbers with one phase value to a different part of a CCD target (or other optical element) than those numbers with a second phase values. In another example, negative numbers are encoded using a different frequency than positive numbers. The different frequencies can be separated using suitable gratings or other optical elements. Alternatively or additionally, a self-electro-optical device may use one frequency in order to modulate the other frequency. Alternatively or additionally, a frequency sensitive CCD may be used, for example an RGB CCD. Alternatively or additionally, a CCD may be provided with binary phase or frequency detection, by providing a controllable polarizer or spectral filter before the CCD and timing its operation to the acquisition of positive or negative numbers.

Alternatively, negative numbers may be managed by biasing them to be positive, for example, by forcing the results of a DCT to be in the range [0 . . . 2] instead of [−1 . . . 1] (normalized values). In practice, if the maximum DC amplitude is A, the DCT results are shifted by +A, from the range [−A . . . A] to the range [0 . . . 2A]. In the example (described below) where a DCT is performed by mirroring the 8×8 datablock into a 16×16 datablock, a strong spatial delta pulse is provided in the middle of each 16×16 datablock, for example by controlling the SLM. The effects of this pulse (the bias) are optionally removed using electronic processing after the data is transformed.

Once the data is multiplied, further processing, such as sign extraction or as described below, can be achieved, for example, by performing optical A/D, and then binary operations or by using electronic components.

In the above description, a plurality of matrix-by-matrix or vector-by matrix operations are performed. The number of actually provided multiplication units depends on the implementation and especially on the level of parallelism of the implementation. For example, in one implementation, all the 8×8 blocks are processed in parallel. However, within each block, the multiplications may be performed in parallel (using a plurality of units if required) or in sequence (reusing a single unit for two operations, for example for row and for column DCT). Alternatively or additionally, two or more of the blocks may be processed in series, for example the two blocks sharing a single 8×8 multiplier. Such sequential processing generally requires electronic components, such as store 74, to read and store intermediate results and possibly also for summing up the individual results.

In an exemplary embodiment of the invention, each matrix multiplication unit comprises a series of {SLM, lens, CCD} subsystems which unit accepts electronic data at one end, converts it into optical signals, transforms the data using lens and then converts the transformed data into electronic signals again. Alternatively, a single SLM and/or a single CCD may be shared among several multipliers.

Figure 4A:
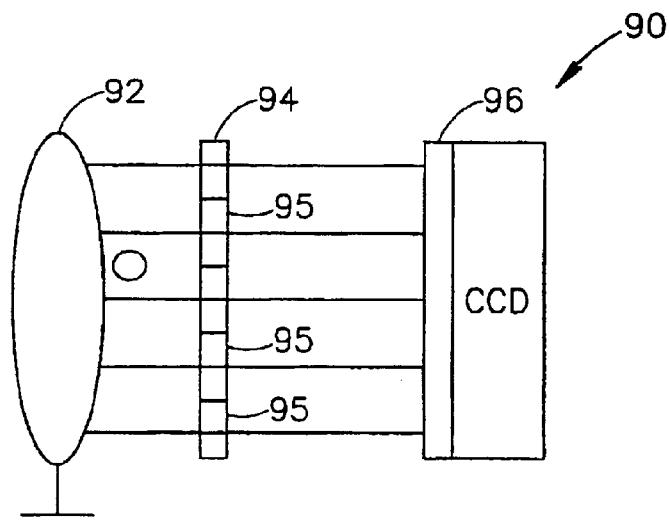
FIG. 4A is a schematic diagram of a lens-matrix based 2D DCT component, in accordance with an exemplary embodiment of the invention.

FIG. 4A is a schematic diagram of a lens-matrix based 2D DCT component 90, in accordance with an exemplary embodiment of the invention. Light from an image of an object 92 impinges on a lens-matrix 94. Array 94 optionally comprises a plurality of lens-elements 95, each of which performs a DCT on one 8×8 block of image 92. The result of the DCT is recorded by a CCD 96.

Figure 4B:
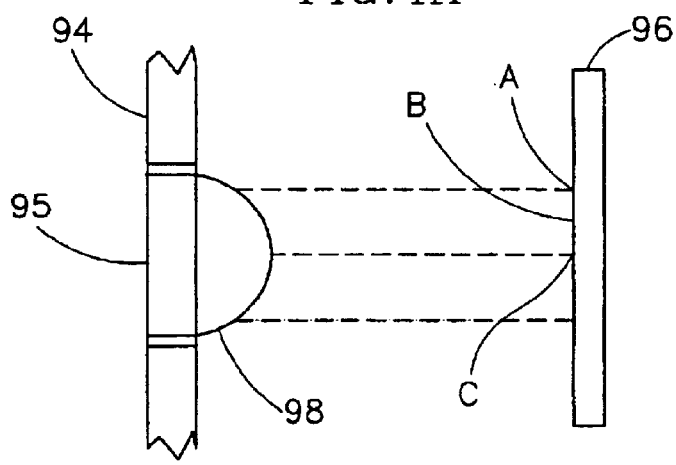
FIG. 4B is a schematic diagram of an optical element for the lens matrix of FIG. 4A.

FIG. 4B is a schematic diagram of a single optical element 98 suitable for the lens matrix of FIG. 4A, for performing a DCT. Optical element 95 is designed so that light emitted by different portions of the lens corresponds to different coefficients of the DCT transform of the impinging light. Thus, light corresponding to a first DCT coefficient is detected by CCD 96 at a point A. Light corresponding to a second DCT coefficient is detected at a point B. Typically, at least some of the light emitted by lens 95 does not correspond to a DCT coefficient, due to design considerations. Such light may be detected, for instance at a point C. The readout of CCD 96 is optionally configured to account for the correspondence between DCT coefficients and spatial locations on CCD 96. In an exemplary embodiment of the invention, a plurality of or even all of optical elements 98 are combined into a single composite optical element. Alternatively, a single optical element 98 may be implemented as a sequence of individual optical elements.

Figure 4C:
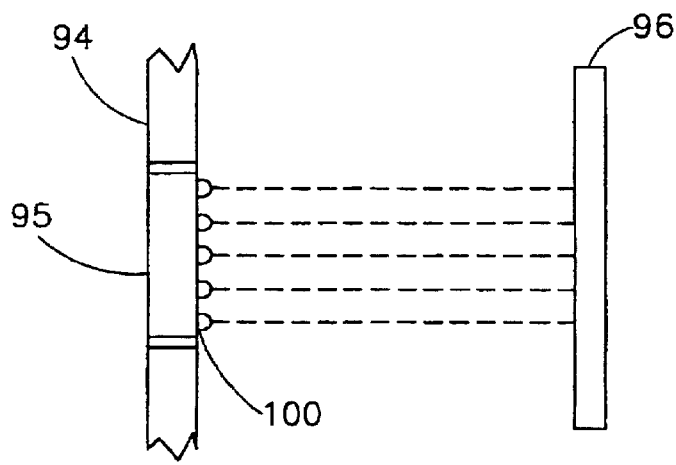
FIG. 4C is a schematic diagram of a lenslet array for the lens matrix of FIG. 4A.

FIG. 4C is a schematic diagram of a lenslet array 100 for the lens matrix of FIG. 4A, for performing a DCT. In a lenslet array, each individual lenslet optionally generates one DCT coefficient from the impinging light. In one exemplary embodiment, light from a 8×8 block of the image is received by 64 lenslets, optionally arranged in a 8×8 array. After each lenslet is a mask having opaque and transmissive portions and a CCD element is positioned opposite the mask to receive light which passes through the mask. In an exemplary embodiment, each lenslet creates an image of the image to be transformed. Each DCT coefficient d(k,l) is defined as:

$$d(k, l) = \sum_{1}^{N} \sum_{1}^{N} f(i, j) h(k, l; i, j) \tag{1}$$

where f is the input and h is the convolution definition. The opaque and transmissive portions of each of the (k,l) masks are defined to represent the values of h, in which the transmissiveness of mask elements for a lenslet (k,l) are defined to match the relative contribution of those image pixels (i,j) which take part in determining the k,l) coefficient. The CCD element sums the light which passes through the mask, determining the DCA coefficient.

The Formula for a DCT transform and for an inverse DCT transform of an 8×8 block of image data f(x,y) and an 8×8 block of transform data F(u,v), are, respectively:

$$F(u, v) = \frac{1}{4} C(u) C(v) \sum_{x=0}^{7} \sum_{y=0}^{7} f(x, y) \cos \frac{(2x+1)u\pi}{16} \cos \frac{(2y+1)v\pi}{16}$$

$$f(x, y) = \frac{1}{4} \sum_{u=0}^{7} \sum_{v=0}^{7} C(u) C(v) F(u, v) \cos \frac{(2x+1)u\pi}{16} \cos \frac{(2y+1)v\pi}{16}$$

where C(u) and C(v) are 1/√2 for u,v=0 and 1 otherwise.

In an exemplary embodiment of the invention, a single large lenslet array is used to implement a matrix of individual lenslet arrays. In an exemplary embodiment of the invention, the light from object 92 is focused onto lens matrix 94, so that all of the object is viewed by each one of the lens elements 95. Alternatively, only a block area of the light impinges on each lens element, for example by providing multiple side-by-side lens, each one viewing only a portion of object 92. Alternatively, where an SLM is used, the light which passes through the SLM can be formed of blocks of non-parallel light, so that block portions of the modulated light impinge each on a different lens element 95. Alternatively, especially where individual optical elements are used, the light from object 92 can be parallel light, so that each optical element receives parallel light from a single block area. In some cases, a lens element may receive light from more than one block area, for example for processing which is beyond the extent of a single block or to provide an overlap between blocks, for example to solve calibration problems.

Figure 4D:
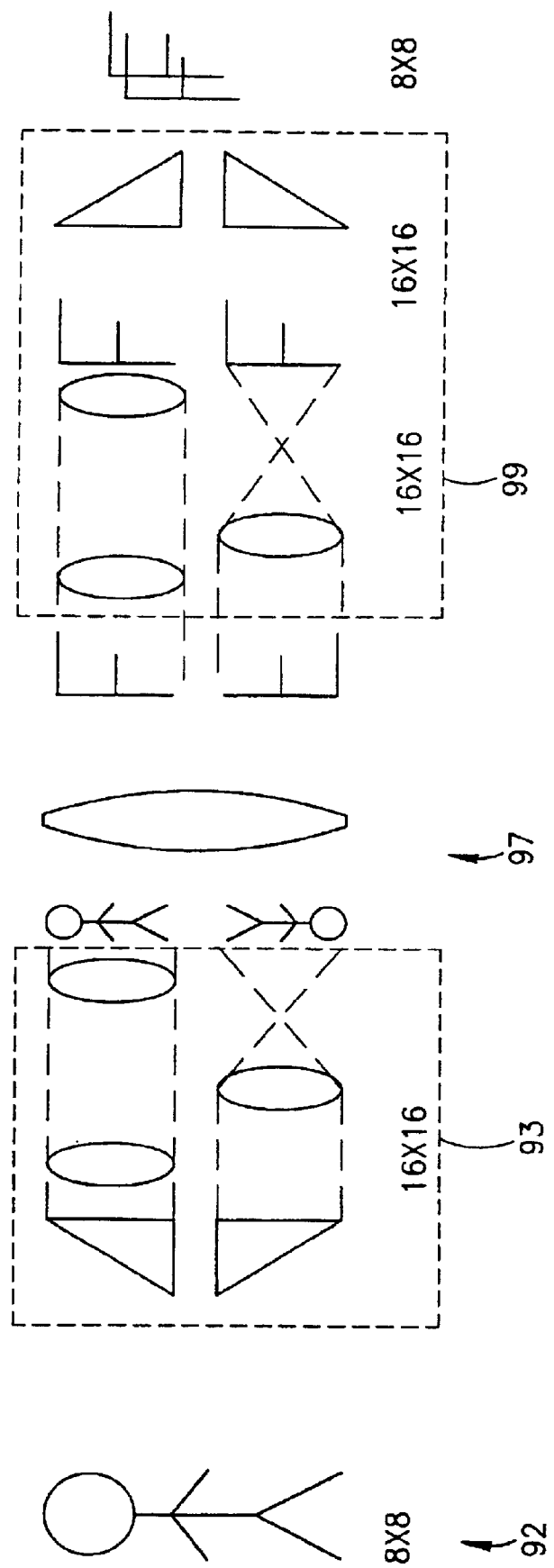
FIG. 4D is a schematic illustration of an optical system for performing a DCT transform using a Fourier lens.

FIG. 4D is a schematic illustration of an optical system for performing a DCT transform using a Fourier lens. Although in one exemplary embodiment of the invention the lens-element directly performs a DCT, in an alternative exemplary embodiment of the invention, a correspondence between Fourier transform and DCT is utilized to perform DCT (or other transforms) using a Fourier transform lens. Mathematically, a Fourier transform of real and symmetrical data results in only real (and symmetric) cosine coefficients. The image data to be compressed is typically real. It can be made symmetric by mirroring in the SLM. In order to achieve a discrete transform, the data is optionally provided as an impulse image, with each image portion being a spatial delta function, each of which pulses is transformed using a Fourier transform lens. This type of data provision can be achieved using an SLM with a pinhole filter. In multi-wavelength based embodiments, different pinholes may be designated for different wavelengths. Optionally both the SLM and the CCD are spatially matched according to the following formula: $\Delta \bar{x} = 0.5 \Delta x$, which defines the distances between the delta (functions (pinholes) in the SLM and $$\Delta u = \frac{\lambda f}{2 \cdot \Delta x \cdot N},$$

which defines the distances between the delta-function receptor in the CCD (can also be modeled by providing a pinhole filter in front of the CCD. In these formula, $\Delta x$ and $\Delta u$ are the intervals between delta functions in the SLM and CCD respectively, f is the focal length, N is the block size and $\Delta \bar{x}$ is the placement of the delta function in the interval (phase shift) in the SLM. It can be seen that the pixels intervals in the CCD and the SLM are not necessarily the same, which may be implemented by ignoring some of the CCD pixels. An alternative matching condition is described below.

In the example of FIG. 4D, an 8×8 block of image 92 is made symmetric using a doubling and mirroring optical system 93 (alternatively to using an SLM) and then transformed by a Fourier lens 97. Since the data is mirrored in two dimensions (only one shown for clarity) a 8×8 block is transformed into a 16×16 block. The result is then combined using a combining optical system 99, to provide an 8×8 DCT transform. In some embodiments of the invention, optical system 93, lens 97 and optical system 99 are combined into a single optical element, thus, the end result is a single optical element which performs a DCT, suitable for use in lens-matrix 94. A matrix of such optical elements may be combined to form a single optical element which performs a block DCT transform. Alternatively to the optical systems shown, other constructions can be utilized for mirroring, doubling and combining. In one example, an image block is first doubled and arranged as a 2×2 matrix of blocks and then individual blocks of the 2×2 matrix are flipped, to provide the symmetry required for the DCT transform (or other type of transform).

The correspondence between Fourier transform and DCT can also be utilized for other optical transform architectures, for example the matrix-vector multiplication method described above. In another example, a wavelet transform can be performed by mirroring data to be anti-symmetric instead of symmetric, as in the DCT case.

The above matching condition may be derived using the following analysis (for a one dimensional case). The following equation defines the JPEG-DCT which is to be achieved:

$$F(k) = \sum_{n=0}^{N-1=7} f(n) \cdot \cos\left(\frac{\pi k (2n+1)}{2N}\right) \quad (2)$$

Assuming symmetric input, where every block of 16 samples is represented as a combination of delta functions, spaced at intervals of size $\Delta x$, and transmitted from a $\Delta \bar{x}$ position inside each interval:

$$s(x) = \sum_{n=0}^{N-1=7} f(n) \cdot \delta(x - n \cdot \Delta x - \Delta \bar{x}) + \sum_{n=0}^{N-1=7} f(n) \cdot \delta(x + n \cdot \Delta x + \Delta \bar{x}) \quad (3)$$

Applying the optical Fourier transform:

$$\tilde{s}(u) = \int_{-\infty}^{\infty} s(x) \cdot e^{-j\frac{2\pi u x}{\lambda f}} dx \quad (4)$$

The imaginary parts cancel out (due to the input being symmetric):

$$\tilde{s}(u) = \sum_{n=0}^{N-1=7} f(n) \cdot \cos\left(\frac{2\pi u \cdot (n \cdot \Delta x + \Delta \bar{x})}{\lambda f}\right) \quad (5)$$

Assuming accurate sampling at the Fourier plane (the CCD):

$$\tilde{s}(k) = \sum_{n=0}^{N-1=7} f(n) \cdot \cos\left(\frac{2\pi \cdot k \cdot \Delta u \cdot (n \cdot \Delta x + \Delta \bar{x})}{\lambda f}\right) \quad (6)$$

Since equation (2) is desired, we match:

$$\tilde{s}(k) = \sum_{n=0}^{N-1=7} f(n) \cdot \cos\left(\frac{2\pi \cdot k \cdot \Delta u \cdot (n \cdot \Delta x + \Delta \bar{x})}{\lambda f}\right) = \quad (7)$$

$$\sum_{n=0}^{N-1=7} f(n) \cdot \cos\left(\frac{\pi k (2n+1)}{2N}\right)$$

Thus, one matching condition is:

$$\cos\left(\frac{2\pi \cdot k \cdot \Delta u \cdot (n \cdot \Delta x + \Delta \bar{x})}{\lambda f}\right) = \cos\left(\frac{\pi k (2n+1)}{2N}\right) \quad (8)$$

Leading to:

$$\frac{\Delta u \cdot \Delta x}{\lambda f} = \frac{1}{2N} \quad (9)$$

and $$\frac{2 \cdot \Delta u \cdot \Delta \bar{x}}{\lambda f} = \frac{1}{2N} \quad (10)$$

resulting in the above matching condition:

$$\begin{cases} \Delta \bar{x} = 0.5 \cdot \Delta x \\ \Delta u = \frac{\lambda f}{2 \Delta x \cdot N} \end{cases} \quad (11)$$

In some cases, it may be not be suitable to provide delta functions (pinholes or other optical elements) on one or both of the SLM and CCD. The following analysis shows a method of matching a CCD and an SLM, by spatially modulating the light in a less drastic manner, for example using continuous neutral density filters.

The following equation describes an SLM-like object:

$$s(x) = \sum_{n=0}^{N-1=7} f(n) \cdot l(x - n \cdot \Delta x) + \sum_{n=0}^{N-1=7} f(n) \cdot l(x + n \cdot \Delta x) \quad (12)$$

Where l(x) is a general transmission function of the SLM, assumed identical for all pixels, and symmetric, so it can be mirrored. However, it should be noted that a similar but more complex analysis can also be performed in the case where not all the pixels are identical.

After applying the optical (and continuous) Fourier transform:

$$\tilde{s}(u) = \sum_{n=0}^{N-1=7} f(n) \cdot L(u) \cdot \cos\left(\frac{2\pi u \cdot n \cdot \Delta x}{\lambda f}\right) \quad (13)$$

Where L(u) is the Fourier transform of l(x). Since the actual sampling is done by summing all intensities on a detector cell (i.e., a CCD pixel cell), equation (5) transforms to:

$$\tilde{s}(k) = \frac{1}{\Delta u} \int_{k \cdot \Delta u - \Delta \bar{u}/2}^{k \cdot \Delta u + \Delta \bar{u}/2} \tilde{s}(u) \cdot W(u) \cdot du \quad (14)$$

Where W(u) is the CCD detection weight function. Again, it is assumed that W is the same for all pixels but this assumption is not required. Using equation (13):

$$\tilde{s}(k) = \frac{1}{\Delta u} \int_{k \cdot \Delta u - \Delta \bar{u}/2}^{k \cdot \Delta u + \Delta \bar{u}/2} W(u) \cdot \left\{ \sum_{n=0}^{N-1=7} f(n) \cdot L(u) \cdot \cos\left(\frac{2\pi \cdot n \cdot \Delta x}{\lambda f}\right) \right\} \cdot du \quad (15)$$

Since equation (2) is desired, we match:

$$\cos\left(\frac{\pi k(2n+1)}{2N}\right) = \frac{1}{\Delta u} \int_{k \cdot \Delta u - \Delta \bar{u}/2}^{k \cdot \Delta u + \Delta \bar{u}/2} W(u) \cdot L(u) \cdot \cos\left(\frac{2\pi \cdot n \cdot \Delta x}{\lambda f}\right) \cdot du \quad (16)$$

We define:

$$R(u) = W(u) \cdot L(u)/\Delta u \quad (17)$$

The matching requirement is thus:

$$\cos\left(\frac{\pi k(2n+1)}{2N}\right) = \int_{k \cdot \Delta u - \Delta \bar{u}/2}^{k \cdot \Delta u + \Delta \bar{u}/2} R(u) \cdot \cos\left(\frac{2\pi \cdot n \cdot \Delta x}{\lambda f}\right) \cdot du, \quad (18)$$

$$n, k = 0, 1, \ldots N-1$$

Which results in the following N×N Fredholm I equations (for the 1D case. In 2D its N×N×N×N equations):

$$\begin{cases} k = 0, n = 0: \\ 1 = \int_{\Delta \bar{u}/2}^{\Delta \bar{u}/2} R(u) \, du \\ k = 0, n = 1: \\ 1 = \int_{\Delta \bar{u}/2}^{\Delta \bar{u}/2} R(u) \cos\left(\frac{2\pi \cdot \Delta x \cdot u}{\lambda f}\right) du \\ \ldots \\ k = 1, n = 0: \\ \cos\left(\frac{\pi}{2N}\right) = \int_{\Delta u - \Delta \bar{u}/2}^{\Delta u + \Delta \bar{u}/2} R(u) \, du \\ k = 1, n = 1: \\ \cos\left(\frac{3\pi}{2N}\right) = \int_{\Delta u - \Delta \bar{u}/2}^{\Delta u + \Delta \bar{u}/2} R(u) \cos\left(\frac{2\pi \cdot \Delta x \cdot u}{\lambda f}\right) du \\ \ldots \end{cases} \quad (19)$$

Equation set (19) defines a Fourier coefficients solution to the problem of describing R(u) by cosine series, i.e., $$R(u)|_k = \sum_{n=0}^{N-1=7} \cos\left(\frac{\pi k(2n+1)}{2N}\right) \cdot \cos\left(\frac{2\pi \cdot u \cdot n \cdot \Delta x}{\lambda f}\right) \quad (20)$$

This solution optionally defines a matching between individual pixels in the SLM(u) and the CCD(k). $u \in [k \cdot \Delta u - \Delta \bar{u}/2, k \cdot \Delta u + \Delta \bar{u}/2]$.

It should be noted that equation 20 actually defines a family of solutions, thus, in some embodiments of the invention, standard geometries of SLMs and CCDs are used, while in others one or both of the SLM and CCD are modified to better fit a particular matching solution. In the general case, the matching may be performed by using neutral filters and by matching at least the locations, if not the sizes of CCD and SLM pixels.

In an exemplary embodiment of the invention, the above matching condition(s) are applied towards other discrete linear transforms which are to be applied using Fourier lens:

$$F(k) = \sum_{n=0}^{N-1} f(n) \cdot C(k, n) \quad (21)$$

Applying the same procedure, as in equations (12)–(20), (18) now reads:

$$C(k, n) = \int_{k \cdot \Delta u - \Delta \bar{u}/2}^{k \cdot \Delta u + \Delta \bar{u}/2} R(u) \cdot \cos\left(\frac{2\pi \cdot n \cdot \Delta x}{\lambda f}\right) \cdot du, n, k = 0, 1, \ldots N-1 \quad (22)$$

So for the general ID linear transform:

$$R(u)|_k = \sum_{n=0}^{N-1} C(k, n) \cdot \cos\left(\frac{2\pi \cdot u \cdot n \cdot \Delta x}{\lambda f}\right), \quad (23)$$

$$u|_k \in [k\Delta u - \Delta \bar{u}/2, k\Delta u + \Delta \bar{u}/2]$$

or the matching condition of equation (11) can be used. In the context of matching conditions it should be noted that a matrix arrangement of sub-elements is not required. Rather, it is sufficient that there be a correspondence between the pixels in the SLM and the pixels in the CCD. A simple construction is that of a matrix of elements.

The use of the above matching condition may depend on the type of detector used. A standard CCD detector measures power (amplitude squared). Thus, a square root of the measurement may need to be determined. Additionally, some types of processing require the sign of the result, or even its phase. Various methods of determining a sign of the result are described above. A related issue is that a CCD detector integrates the square of the amplitude, so when even after taking a square root the result is not precise. However, in many cases the effect of the error is negligible and usually smaller than that allowed by the JPEG standard. This error is especially small if most of the CCD area (for each pixel) is ignored. Ignoring most of the CCD area is also useful in that it reduces noise, albeit usually requiring more signal strength.

Alternatively, an amplitude (rather than power) detector is used, for example using a detector with a gamma of 0.5. Alternatively or additionally, a phase detector is used to determine the sign. One possible implementation of a phase detector is to supply a polarized reference beam that can be compared to the detected beam, for example using inference effects.

In an alternative exemplary embodiment of the invention, DCT, FFT or block transforms are achieved using a holographic lens, for example replacing lens-matrix 94, individual lens-elements 95 and/or other optical elements (described below). Alternatively or additionally, two dimensional holograms may be used, for example, by providing arrays of phase and amplitude modifying materials, instead of refracting elements. Alternatively or additionally, a look-up-table based approach to transforming may be used, for example using the look-up table methods described in U.S. Pat. No. 4,892,370, the disclosure of which is incorporated herein by reference. Alternatively or additionally, acousto-optical type optical elements are used. An advantage of transform-lens, such as described with reference to FIGS. 4A–4D, is that they are better matched to the physical model of the compression, i.e., transforming data from an image space into a transform space. Holograms are a general purpose optical element design method, which although they are very flexible, may have an efficiency penalty. Look-up tables are general purpose solutions which may require a larger and/or more complex optical architecture than a matched architecture such as a lenslet array.

Figure 5A:
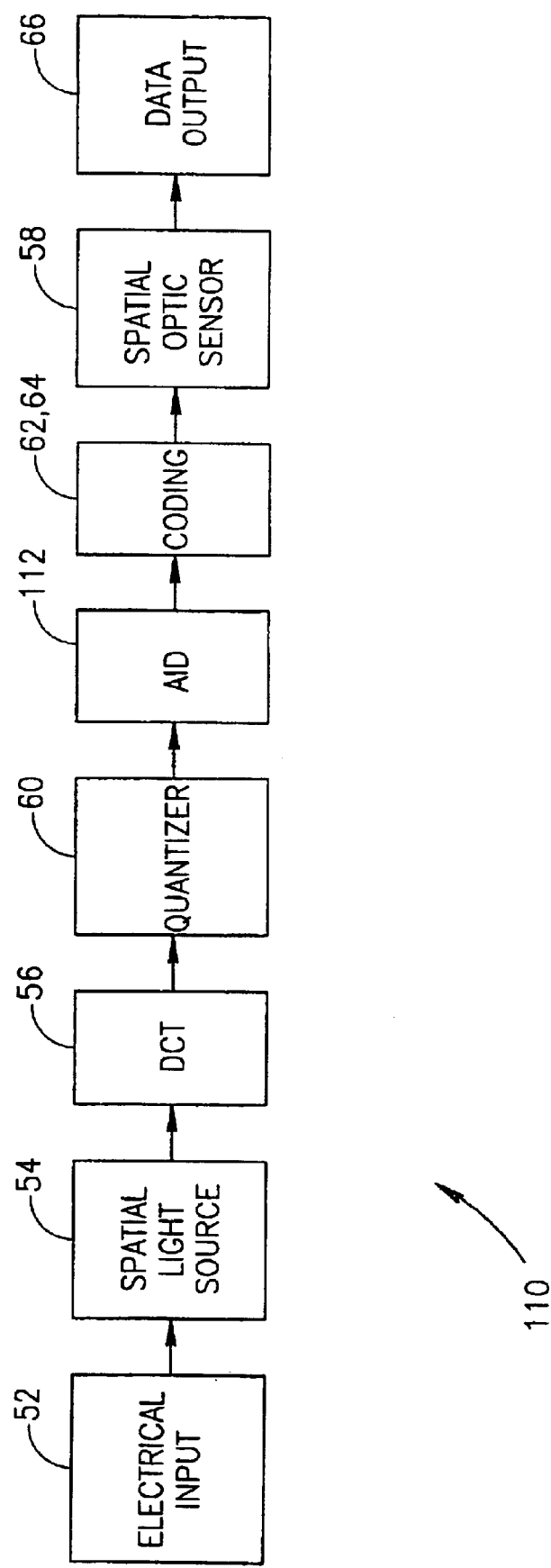
FIG. 5A is a schematic block diagram of an optical JPEG compression system, in accordance with another exemplary embodiment of the invention.

FIG. 5A is a schematic block diagram of an optical JPEG compression system 110, in accordance with another exemplary embodiment of the invention, in which the DCT transformed data is further processed prior to being converted to electrical signals. A main difference from the embodiment of FIG. 2 is the provision of an A/D converter 112, which converts the data from an analog representation to a digital representation. Thus, coding (e.g., VLC and Huffman) can be performed optically using various types of available hardware architectures. The Zig-Zag step (26) may be performed before or after quantization, for example, even after the data is converted to electrical signals, by optical sensor 58. An exemplary optical A/D converter is described in "Real-Time Parallel Optical Analog-to-Digital Conversion", by A. Armand, A. A. Sawchuk, T. C. Strand, D. Boswell and B. M. Soffer, in *Optics Letters*, Vol. 5 No. 3, March 1980, the disclosure of which is incorporated herein by reference.

In the embodiment of FIG. 5A, quantization is shown as being performed on the optical data, for example utilizing an SLM or a controllable attenuator such as an LCA with one or more face polarizers which selectively "divide" DCT coefficients by a weight. Alternatively, the data is quantized after the A/D conversion, for example using a suitable lookup table or a holographic lens. In embodiments where digital data is represented by spatial bit patterns, as in the above paper ("real-time"), quantizing may be performed by spatially blocking out certain bits. In embodiments where digital data is represented temporally, temporal filtering may be used in which certain pixels are darkened, in synchrony to the bit order of the light pattern, so that those bits are blocked out. It is noted that the quantization step and the encoding step (at least the VLC) may be combined as a single step, using relatively standard tables, as known in the art of electronic JPEG.

In some embodiments of the invention, it is desirable to achieve different spatial and/or bit resolutions for different parts of the image. In one example, the CCD can be read out at varying resolutions, responsive to the desired spatial resolution. In another example the light source is defocused for portions where a lower resolution is required. Alternatively or additionally, the quantization is varied between the blocks. If for example quantization is achieved by selective blocking of pixels, this blocking may be implemented using an electrically controllable spatial filter, for example an LCD, which can be set to the desired quantization.

In an exemplary embodiment of the invention it is desirable to simultaneously generate multiple resolutions of JPEG data. In an exemplary embodiment of the invention, this is achieved by parallel application of the JPEG algorithm, using hardware as described herein. Alternatively, this may be achieved (for example in the embodiment of FIG. 2) by reading out the CCD at different resolutions, for different JPEG resolution levels. Alternatively, varying resolutions may be achieved by zooming the source image 92 up or down, for example using a zooming lens or by suitable control of an SLM which generates the light.

Compression of color images may be achieved by converting the image from an RGB format into a YUV format (if it is not already so represented) and then compressing each of the Y, U and V components. Typically, only the Y component is compressed at a full spatial resolution, while the U and V components are compressed at half their spatial resolution. In one exemplary embodiment of the invention, different hardware is provided for the different components. Alternatively, the same hardware is used, sequentially. Alternatively, other color component separation methods may be used.

In an exemplary embodiment of the invention, an image sequence, such as a video sequence is compressed utilizing the above methodology. In an exemplary embodiment of the invention, each of the images in the sequence sequences is compressed in turn using the above method of JPEG compression, providing a series of JPEG compressed images. In an exemplary embodiment of the invention, inter-frame compression is achieved by motion estimation for example using adaptive differential coding by subtracting consecutive images. In an exemplary embodiment of the invention, consecutive images are subtracted using an SLM which is driven with a previous image's density distribution. In a self-electro-optic effect device, the SLM can be programmed directly using the previous image, without requiring external electronics to store or otherwise manipulate the image.

In some configurations, especially those using lower quality optics, light from one group of pixels (i.e., an 8×8 block) pixel may spill into an adjacent group, adding noise to the processing process. In some cases, but not typically, even leakage between two adjacent pixels is a problem. In some embodiments of the invention, this issue is tackled by separating light in adjacent channels (pixels), so as to reduce the probability, degree and/or intensity of overlap.

In some embodiments of the invention, the separation is achieved using spatial separation. In one exemplary embodiment of the invention, a light absorbing material is provided between adjacent groups or pixels (e.g., on SLM, CDD or in optical path between them).

Figure 5B:
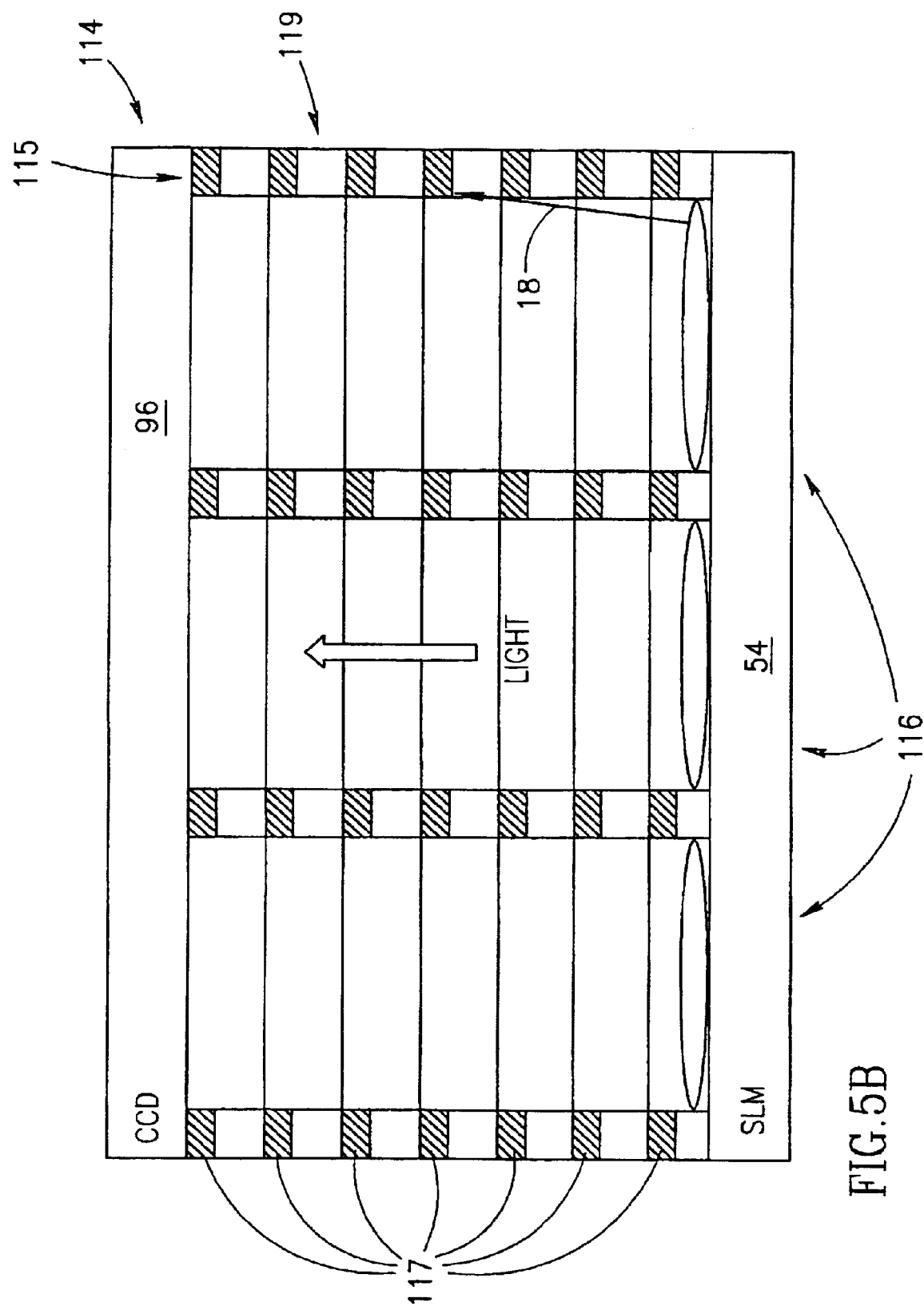
FIG. 5B is a schematic cross-section of a channel separation method in accordance with an exemplary embodiment of the invention.

FIG. 5B is a schematic cross-section of a channel separation method in accordance with an exemplary embodiment of the invention. A device 114 comprises a plurality of channels 116. The channels are separated by absorbing columns 115. In one embodiment of the invention (not shown) the columns are solid. However, light may reflect off the side of such a solid column. Thus, in an exemplary embodiment of the invention, each of columns 115 comprises a plurality of spaced apart absorbing portions 117. When a near parallel ray of light hits such a portion (as shown by arrow 118) the ray is likely to hit the absorbing material at a near perpendicular angle, assuring a high absorption. In one particular implementation, a plurality of layers 119 are provided, each layer having at least one absorbing portion 117 defined thereon. Layers 119 are stacked to achieve the configuration shown in FIG. 5B. portions 117 may be the thickness of a layer, in which cases the layers are optionally arranged so that portions 117 of two contiguous layers are not aligned. Alternatively, portions 117 are shallow. In some embodiments, a generous spacing between portions 117 is provided, so that light will be less likely to be reflected off the sides of portions 117. Alternatively or additionally to spacing, portions 117 may have a sawtooth pattern defined thereon which has a face substantially perpendicular to light rays 118. Although absorbing portions 117 are shown to have a face perpendicular to main path of the light, other angles may also be used advantageously, for example to provide faces which are perpendicular to off-axis light rays, such as light ray 118.

Alternatively to light absorbing material, beam forming elements may be provided to maintain the light beams in paths corresponding to their individual channels. Alternatively or additionally, light from adjacent groups or pixels may be separated using divergent optics, so that there is dead space between the individual beams. Alternatively or additionally, inactive CCD or SLM elements may be used so that the pixels are generated and/or detected in spatial separation. Alternatively or additionally, non-square pixels are used, for example circular pixels, so that there is less contact between adjacent pixels. Alternatively or additionally, the pixel groups are mapped onto non-square regions, for example circles, to minimize overlap.

Alternatively or additionally to spatial separation, temporal separation may be practiced. In one example, the image plane is separated into two or more sets of pixels such that there is spatial separation between pixels (or specific groups thereof) of each plane, within the plane. Then the two planes are processed at a relative temporal delay, to reduce inter-pixel interactions. The separation may be achieved, for example at the SLM or at the detector.

Alternatively or additionally, frequency separation may be practiced, with adjacent pixels or other pixels in danger of overlap having different wavelengths of light.

Alternatively or additionally, polarization frequency may be practiced, for example adjacent pixels using light polarized at 90° relative to each other. Optionally, each pixel utilizes two polarizers, one when it is generated (or later in the optical path) and one when it is detected (or earlier in the optical path). Possibly, source polarization is provided by the SLM, in addition to or instead of a separate polarizer.

In the above separation methods, different configurations may be used based on the expected degree of leakage of light. For example, in a simplest case, the separation is in a checkerboard pattern having alternating "black" and "white" pixels, with the "black" pixels (or pixel groups) being one channel type (e.g., polarization angle, frequency, time delay), and the "white" pixels having a second value. Alternatively more than two channels are used, for example if leakage of a pixel to a distance of more than one pixel is expected. In the example of polarization, the relative angle may be selected to be 70°, rather than 90°.

Alternatively or additionally to physical based separation methods, a calculation based separation method is provided as follows:

In an exemplary embodiment of the invention, instead of using a single lenslet per each channel (e.g., 8×8 block), a single lenslet (or other optical element) is provided for a plurality of channels, for example, for an array of 3*3 channels. Optionally, prisms are added to the all the channels except to the central one in order to obtain the desired DCT coefficients in the same positions at the output plane as in the above systems. Alternatively, other spatially shifting optical elements may be used.

In an exemplary embodiment of the invention, overlapping between the information of two adjacent channels in the output plane is removed using matched sampling. Denoting the DCT of one of the channels "A" by $H_a(x)$ and the DCT of its adjacent channel "B" by $H_b(x)$. Since channels A and B are adjacent in the output plane (in the overlapping region):

$$E(x) = H_a(x) + H_b(x) e^{2\pi i x \Delta x/(\lambda f)}$$

where E is the total field. The linear phase arises since shift is expressed as a linear phase in the Fourier-plane. $\Delta x$ is the size of a channel in the input plane. $\lambda$ is the wavelength and f is the focal length.

The root of the intensity in the Fourier plane is $$|E(x)| = \sqrt{\left[H_a(x) + H_b(x)\cos\left(\frac{2\pi x \Delta x}{\lambda f}\right)\right]^2 + \left[H_b(x)\sin\left(\frac{2\pi x \Delta x}{\lambda f}\right)\right]^2}$$

It should be noted that the maximal frequency of $H_a$ or of $H_b$ is smaller than $\Delta x/\lambda f$ since the dimensions of each channel do not exceed $\Delta x$. Thus, H is more or less constant when sampled within its own pixel. This is not generally true regarding the fast oscillating sine and cosine:

$$H_{a,b}\left(n\delta x + \frac{\delta x}{4}\right) = H_{a,b}\left(n\delta x + \frac{\delta x}{2}\right) = H_{a,b}(n\delta x) \quad \delta x = \frac{\lambda f}{\Delta x}$$

where n is the pixel number and $\delta x$ is pixels dimensions. On the other hand:

$$\sin\left(\frac{2\pi}{\delta x}n\delta x + \frac{2\pi}{\delta x}\frac{\delta x}{4}\right) = 1 \quad \sin\left(\frac{2\pi}{\delta x}n\delta x + \frac{2\pi}{\delta x}\frac{\delta x}{2}\right) = 0$$

$$\cos\left(\frac{2\pi}{\delta x}n\delta x + \frac{2\pi}{\delta x}\frac{\delta x}{4}\right) = 0 \quad \cos\left(\frac{2\pi}{\delta x}n\delta x + \frac{2\pi}{\delta x}\frac{\delta x}{2}\right) = -1$$

Thus, the output intensity root becomes:

$$\left|E\left(n\delta x + \frac{\delta x}{4}\right)\right| = \sqrt{H_a(n\delta x)^2 + H_b(n\delta x)^2}$$

$$\left|E\left(n\delta x + \frac{\delta x}{2}\right)\right| = H_a(n\delta x) + H_b(n\delta x)$$

which allows, by a fixed computation, to extract the value of the present facet $H_a$ and the overlapping information coming from the adjacent facet $H_b$.

It should be noted that since the dimensions of the input channel are unchanged, the above-mentioned derivation does not change the length of the system required due to the conventional matching condition. The fixed computations may be applied at various stages of the system, depending on the system design, for example using optical processing, on the CCD plane or in a digital post-processing.

Figure 6:
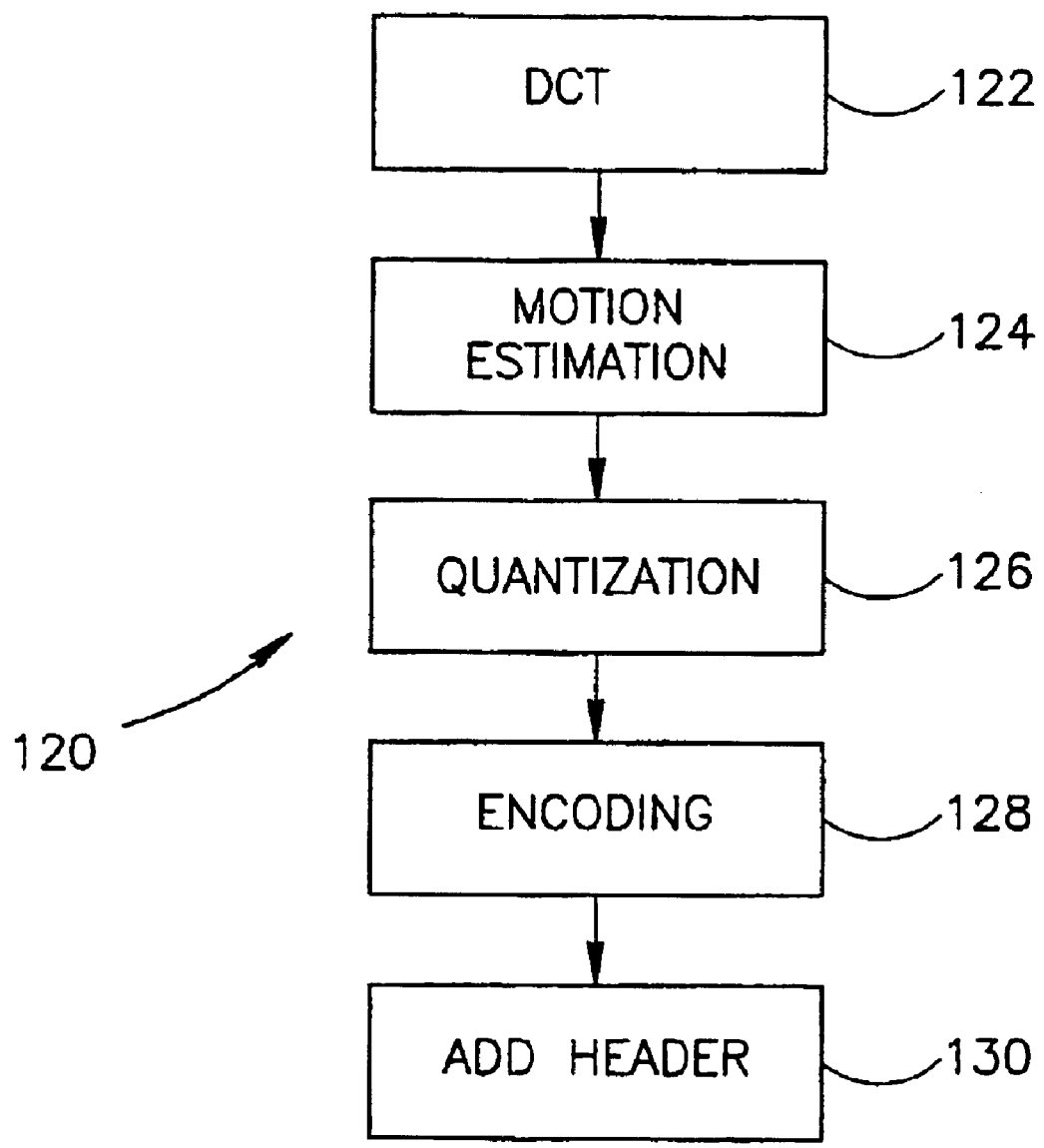
FIG. 6 is a schematic flowchart of a base-line method of MPEG-compliant compression.

FIG. 6 is a simplified schematic flowchart of a base-line method 120 of MPEG-compliant compression, which flowchart does not show various feedback loops often utilized in the MPEG compression method. One of the main advantages of the MPEG compression method over the JPEG compression method is that the MPEG method takes into account similarities between consecutive images. One of the main tools for similarity determination is motion estimation, in which the motion of portions of the image are determined, so that an image can be reconstructed from spatially translated parts of previous images. Transmitting only the amount of translation usually requires less bandwidth than transmitting coefficients for an entire block. Thus, in an exemplary method, input data is transformed using a DCT transform (122). Motion estimation is performed (124). The resulting coefficients of translation data is quantized (126), encoded (128) and combined with a header (130) to form a data stream.

In an exemplary embodiment of the invention, alternatively or additionally to performing the DCT step using optical processing methods, also the motion estimation is performed using optical processing. In an exemplary embodiment of the invention, motion estimation is performed by performing an autocorrelation of the source data with itself, allowing small amounts of block motion, using well known optical means, to determine block motion. Alternatively however, a DCT based motion estimation scheme is used. Thus, a same or similar hardware as used for the DCT may also be used for at least part of the motion estimation. A method of motion estimation using DCT is described in a Ph.D. Dissertation titled "Low Complexity and High Throughput Fully DCT-Based Motion Compensated Video Coders", by Ut-Va Koc, presented in 1996 to K. J. Ray Liu of the institute for systems research and sponsored by the National Science Foundation Engineering Research Center Program, the University of Maryland, Harvard University and Industry, in U. V. Koc and K. J. R. Liu, "Low-Complexity Motion Estimation Techniques", U.S. Pat. No. 5,790,686, issued Aug. 4, 1998 and in U. V. Koc and K. J. R. Liu, "DCT-Based Motion Estimation", IEEE Trans. on Image Processing, Vol. 7, No. 7, pp. 948–965, July, 1998, the disclosures of which are incorporated herein by reference. The method described therein can be summarized as follows (based on table 4.2 in the Ph.D. dissertation), with the DCT portions optionally being performed as described herein. Optionally, other elements of the process are also implemented using optical components, for example peak finding.

a. Compute the 2D DCT coefficients of second kind (2D-DCT-II) of an N×N block of pixels at the current frame t, $\{x_t(m,n); m,n \in \{0, \ldots, N-1\}\}$.

b. Convert stored 2D-DCT-II coefficients of the corresponding N×N block of pixels at the previous frame t−1, $\{x_{t-1}(m,n); m,n \in \{0, \ldots, N-1\}\}$ into 2D DCT coefficients of first kind (2D-DCT-1) through a simple rotation unit T.

c. Find the pseudo phases $\{g^{CS}(k,l); k=0,1,\ldots,N-1; l=1,2,\ldots,N\}$ and $\{g^{SC}(k,l); k=1,2,\ldots,N; l=0,1,\ldots,N-1\}$, which are calculated from the DCT coefficients independently at each spectral location.

d. Determine the normalized pseudo phases f(k,l) and g(k,l) from $g^{CS}$ and $g^{SC}$ by setting ill-formed pseudo phases to zero.

e. obtain the inverse DCT (2D-IDCT-II) of f(k,l) and g(k,l) as DCS(m,n) and DSC(m,n) for $m,n \in \{0, \ldots, N-1\}$ respectively.

f. Find peaks in DSC and DCS, which peak positions represent the shift amounts and peak signs represent the direction of movement.

g. Estimate the displacement from the signs and positions of the found peaks.

It is noted that even in this method of motion estimation, some processing is required beyond the DCT, however, a significant portion of the computation may be dealt with by DCT or IDCT transforming of the data (in parallel or in sequence for each block). In an exemplary embodiment of the invention, the previous image and/or its DCT coefficients are stored and/or provided using suitable electronics. Possibly, the optical DCT transforming elements are used for performing DCT and IDCT. Alternatively to the above method of motion estimation, direct correlation of image blocks may be used to estimate motion, for example, using image correlation optical systems known in the art as part of the compression process.

The above description has centered on compression, however, it should be noted, that decompression is very similar to compression and can often utilize similar or the same hardware. In the example of JPEG, DCT (for compression) and inverse DCT (for decompression) can be performed using a same optical transform element. In the example of MPEG, motion compensation, i.e., recreating images by compensating for the effect of motion, which motion was determined using motion estimation, can utilize a similar DCT-based method, also described in the above doctorate. It is noted that for some decompression methods, there is a requirement for some processing before the transforming of coefficients into an image domain. For example, in JPEG de-compression, the compressed image data is un-runlength encoded and dequantized prior to being IDCTed. As with compression, these processing steps may be performed optically and/or electronically, depending on the implementation.

Figure 7A:
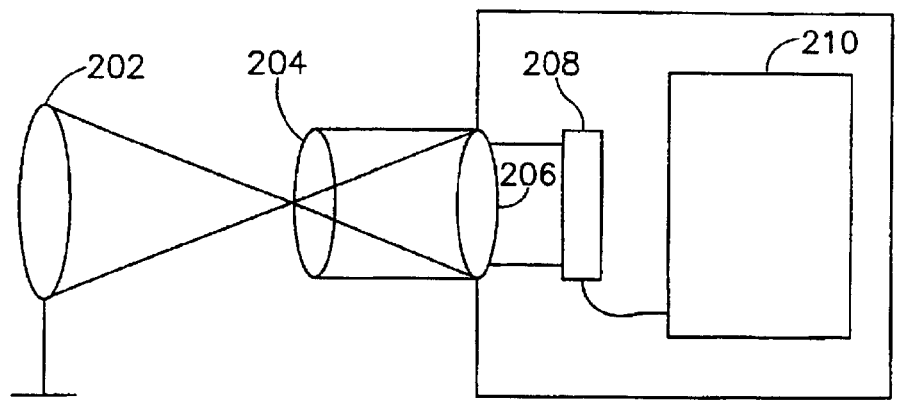
FIG. 7A is a schematic diagram of a direct-compression camera system, in accordance with an exemplary embodiment of the invention.

FIG. 7A is a schematic diagram of a direct-compression camera system 200, in accordance with an exemplary embodiment of the invention. In system 200, an image of a real object 202 is acquired directly as transformed and/or compressed data, rather than being acquired as image data which is later compressed. There are many applications in which an image is acquired in order to be stored on a digital media or in order to be transmitted over bandwidth-limited transmission lines. Examples of such applications include digital cameras, security cameras, teleconferencing systems, live-feed TV cameras and video-telephones. In an exemplary embodiment of the invention, the data is acquired in a compressed manner, using the above described methods of compressing optical data, except that it is optionally the original optical waves, arriving from the object, that are compressed, rather than an electronic representation which is separately acquired and compressed.

In the exemplary system of FIG. 7A, an optional object lens 204 focuses and directs the light from object 202 onto a DCT lens (or lens matrix) 206. Lens 206 may also comprise other optical elements which perform further steps of the image compression method. The processed light is collected by a CCD 208 and then further processed and stored in a storage 210. In real-time embodiments, the acquired data may be transmitted, instead of or in addition to storage. The compression method performed may be a method suitable for still images, such as JPEG or a method suitable for moving images.

In an exemplary embodiment of the invention, DCT lens 206 is designed to operate on white light. Alternatively, the light arriving from the scene is filtered so that it is monochrome. Alternatively or additionally, the image is acquired under controlled lighting situations, so that the light has known characteristics, such as being coherent, monochromatic or formed of a small number of narrow spectral bands. Alternatively or additionally, the image is acquired using a monochromatic light, possible a laser flash, so that the characteristics of the light are controlled by system 200. Such controlled lighting is especially useful for low-light level cameras, such as those using GICCD (Gated Intensified CCD) technology. Also, the use of coherent light simplifies the use of hologram-based image processing techniques.

Alternatively or additionally to an objective lens 204, a light encoding module, such as a combination CCD/SLM may be used, to convert incoming light into light having desired spatial and spectral characteristics. Alternatively or additionally, a self-electro-optical effect shutter is used, in which the impinging light is used to modulate the transmission of last or other controlled light.

Figure 7B:
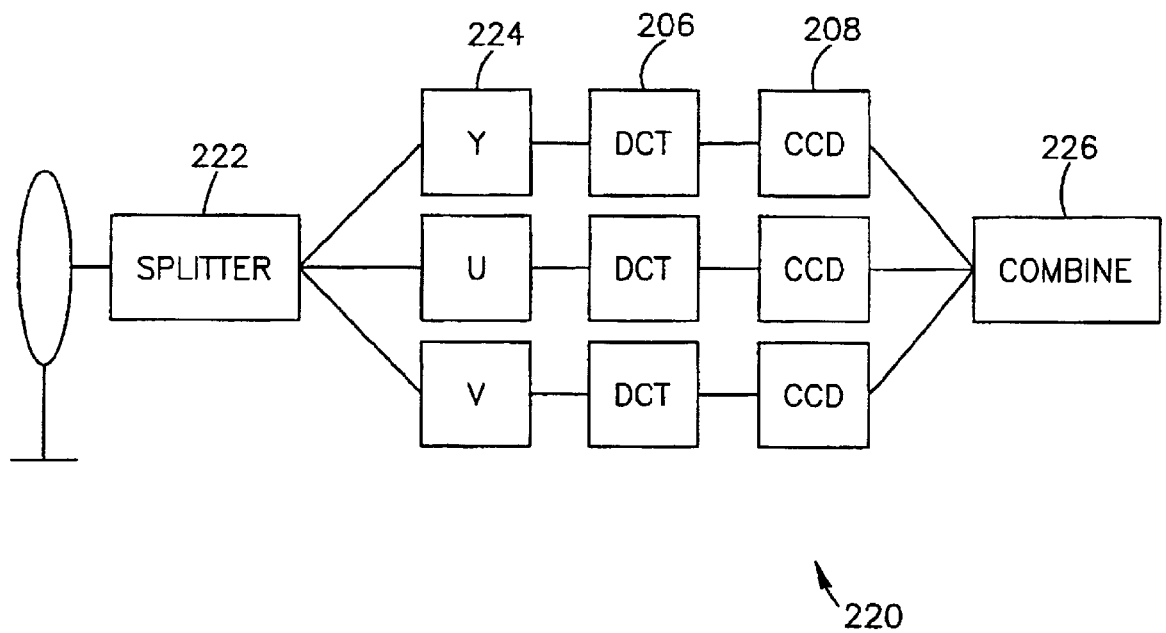
FIG. 7B is a schematic block diagram of a YUV-separated implementation of the embodiment of FIG. 7A.

FIG. 7B is a schematic block diagram of a YUV-separated implementation 220 of the embodiment of FIG. 7A. Color images may be compressed by separately compressing each color component, or more commonly, each of the YUV components. These components may be determined using a look-up table or by simple arithmetic on the R, G and B components of an incoming image. These separations may be performed using optical means and/or electronic means, shown generally as a splitter 222. Each of the resulting color components (224) is then processed separately, using a dedicated DCT 206 and a dedicated CCD 208. The results are then added using a combiner 226. It should be noted that the U component and the V component are usually processed at a lower resolution than the Y component. Thus, the U and the V can share optical components. Alternatively or additionally, all three components are processed using a single optical path, for example on different parts of a same lens-CCD set. Alternatively or additionally, the three components are processed sequentially.

A component which performs image compression or decompression may be packed in various ways, depending on the application. In one application, a PC graphics card includes an optical processor for aiding in displaying MPEG images. In another example, a CCD camera includes an MPEG or a JPEG optical module so that they can provide a compressed data output as well as a standard data output.

In an exemplary embodiment of the invention, the above described optical elements are provided embedded in a transparent substrate, such as a clear plastic or glass, so that once the elements are coupled, there is no relative movement due to vibration, heat or other external forces. It should be noted that pixel-sized transverse shifts in the optical elements do not substantially affect the output, providing the SLM can be controlled to shift its image by the pixel shift error. In an exemplary embodiment of the invention, the optical elements are manufactured and tested without a surrounding matrix or with a liquid surrounding matrix, which is then solidified when the relative positions of the optical elements are determined. In an exemplary embodiment of the invention, the optical processor is calibrated by entering known data and measuring the compressed (or other processing) output and then correcting for it.

Figure 11:
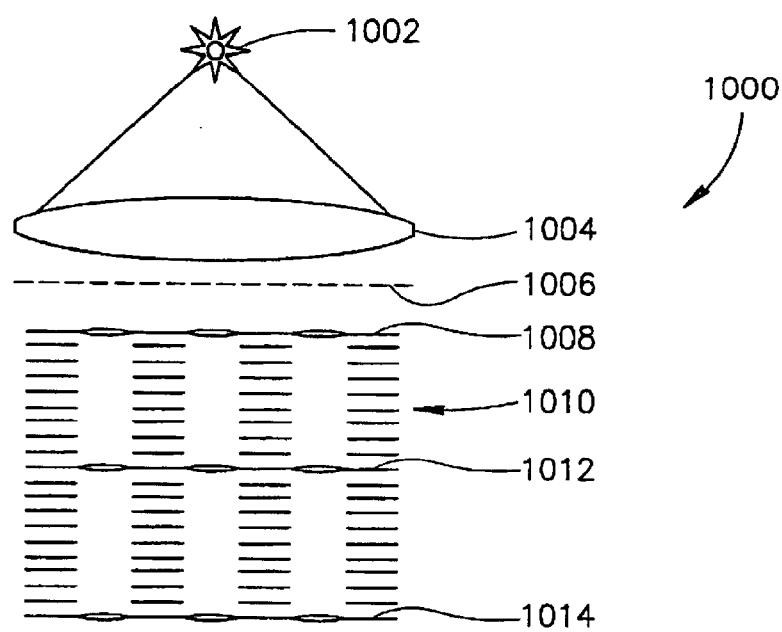
FIG. 11 is a conjugate-zone array based optical processor, in accordance with an exemplary embodiment of the invention.

FIG. 11 is a conjugate-zone array based optical processor 1000, in accordance with an exemplary embodiment of the invention. Processor 1000 can be used to process temporally incoherent light, which is optionally spatially coherent. In some embodiments, the use of incoherent light allows a less robust and exact design to be used, since there are fewer or no interference effects. A white light source 1002 which is spatially coherent, for example a white LED or a halogen source is spread using a lens 1004 to provide an area source. Optionally, the light is collimated by the lens or by a collimator into a parallel or fan beam. Alternatively, other types of one or two dimensional light sources may be used. Optionally, a multi-wavelength source in which each wavelength profile is spatial coherent (e.g., 2, 4, 5, 10, 100 or more spectral lines) is used instead of a white light source, to allow better control over the constituent frequencies.

The light is spatially modulated by an SLM 1006, which may be of any type, for example as described elsewhere in this application. Alternatively, other spatially modulated white light sources may be used. In some exemplary embodiments of the invention, the light is spatially coherent. A Fourier transform is applied to the spatially modulated light using two conjugated zone plates 1008 and 1012. Other optical elements may be used as well. Typically, processing multi-frequency light results in two sometimes undesirable effects, (a) dispersion of the results; and (b) wavelength based scaling. In an exemplary embodiment of the invention, a combination of two or more compensating dispersive elements is used, such that one compensate for the dispersion and/or scaling caused by the other. In some cases, a controlled amount of dispersion may be desired. Fourier derived transforms, which are transforms that can be mathematically derived from an expression of a Fourier transform, such as DCT, DFT or the Fourier transform itself, can be determined, for example by providing symmetrically mirrored input, as described herein. In an exemplary embodiment of the invention, array versions of plates 1008 and 1012 are provided, to allow multi-channel processing. Various channel separation methods may be used (for example channel separation elements indicated as reference 1010), for example as described herein. The results are detected using a detector array 1014. Exemplary suitable conjugate zone plate designs are described in D. Mendlovic, Z. Zalevsky and P. Andreas, "A novel device for achieving negative or positive dispersion and its application," Optik 110, 45–50 (1999), the disclosure of which is incorporated herein by reference.

Figure 8:
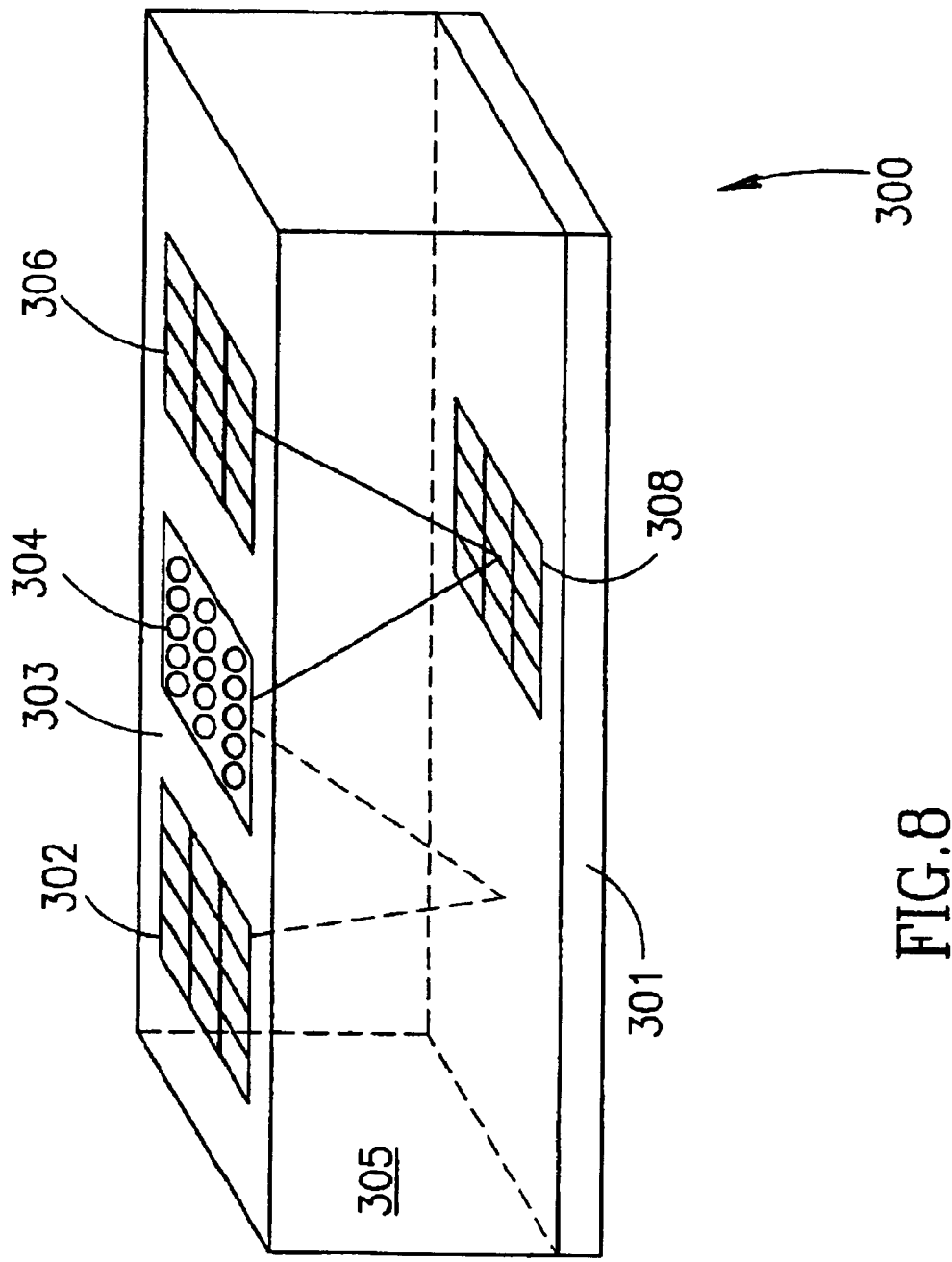
FIG. 8 is a schematic diagram of a lithographic implementation of an optical compression system in accordance with an exemplary embodiment of the invention.

FIG. 8 is a schematic diagram of a lithographic implementation of an optical compression system 300 in accordance with an exemplary embodiment of the invention. An advantage of lithographic optics is that they can be fabricated in large batches, and, depending on the process, in conjunction with the forming of electronic circuits on a same substrate. It should be noted that most lithographic implementations utilize reflective optics rather than transmissive optics. The above description has focused on transmissive optics, however, reflective optics can also be used for non-lithographic optical processors. Various lithographic implementations will occur to a person skilled in the art, however, an exemplary embodiment is shown in FIG. 8.

System 300 comprises generally of a substrate 301, one or more reflective surfaces 303 which are etched and/or otherwise lithographically processed or micro-machined to form reflective optical elements and an interposing clear medium 305. An SLM or a diode array 302 is used to provide an image. The light is reflected off substrate 301 to a reflective DCT lens 304. The transformed light is reflected back to substrate 301 and then to a CCD or other optical array detector 306. Optionally, the CCD array or other optical, electrical or electro-optical elements may be formed directly on the substrate, for example as indicated by reference 308. In one example, a quantizer, or a holographic reflecting lens are formed at location 308. Possibly, reference 308 indicates an active element, such as an LCD array. Alternatively or additionally, diffractive or refractive elements, for example bi-refringent calcite crystals as described below, may be used in part of the construction of system 300.

In an exemplary embodiment of the invention, device 300 is manufactured to DCT a single 8×8 block rather than a whole image. A plurality of systems 300 is optionally used to compress an entire image. Alternatively, system 300 is manufactured to process a single vector rather than an array. Although system 300 may form a part of a dedicated JPEG or MPEG decoder or encoder, in an exemplary embodiment of the invention, one or more system 300 type elements are used for the construction of digital signal processor or other integrated circuits, for example to assist in high-end graphical applications.

In one exemplary embodiment of the invention, a reflective SLM is coupled directly to a back of a CCD camera Thus, cheaper, more efficient and/or faster circuitry can be used to couple light input at the CCD to encoding of light reflected by the SLM. In one example, the CCD-SLM sandwich can encode laser light using light from an external object, which impinges on the CCD. In another example, electronic circuitry sandwiched between the SLM and the CCD can perform various electronic processing steps, as suggested herein. Typically, a highly parallel architecture can be achieved, so a higher than standard throughput is envisioned for some implementations. Several variations of such an SLM, especially with the capability of processing the data between the CCD and the SLM, are described in U.S. Pat. No. 5,227,886, the disclosure of which is incorporated herein by reference. These SLMs can use parallel connections between the CCD elements and the SLM elements or serial connections.

FIGS. 12–15 illustrate various exemplary embodiments of reflective optical processors. Various additional optical elements, such as masks and SLMs may be added to the embodiments shown, to achieve various effects. One or more of the following potential advantages may be realized:

(a) reduction or elimination of dead zones of transmissive SLMs, by using reflective SLMs;

(b) allowing electronic circuitry for SLM pixels to be mounted behind the SLM, possibly on a same substrate, thus possibly shortening communication and/or power lines and/or allowing faster operation;

(c) allowing the construction of a smaller volume device and/or devices of various geometries, such as "L" shaped or "U" shaped, utilizing the optical path folding characteristics of reflective optics.

Figure 12:
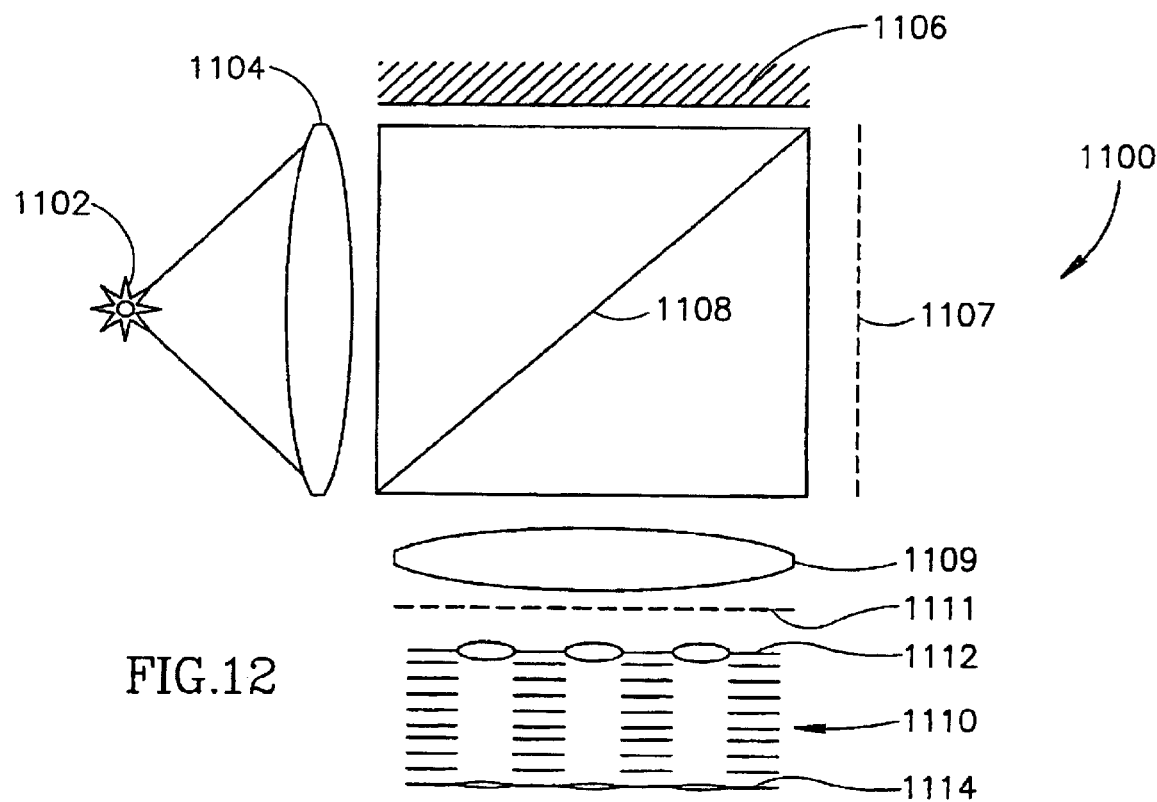
FIG. 12 is a schematic diagram of a polarizing reflective optical processor, in accordance with an exemplary embodiment of the invention.

FIG. 12 is a schematic diagram of a polarizing reflective optical processor 1100, in accordance with an exemplary embodiment of the invention. A light source 1102 is expanded using a lens 1104 to provide a one or two dimensional optical source. Alternatively, other means of providing a large, preferably temporal coherent source may be used. The light, which is optionally polarized, is intercepted by a polarizing beam splitter 1108 or another similar optical element, that reflects a significant part of the light towards a reflective SLM 1106. A polarizing beam splitter is preferred for some embodiments, for example, for reason of energy efficiency, however, it is not essential. The light is modulated by the SLM and reflected towards a detector array 1114. The light may pass through beam splitter 1108 without any significant interaction, for example if the SLM changes the polarization of the light, or if a suitable λ/4 wave-plate is provided in the light path. Alternatively, SLM 1106 is not perpendicular to the path of the light, so the light is reflected at an angle, and bypasses the beam splitter.

Before reaching detector 1114, the light may be imaged using a lens 1109 onto an image plane 1111. The image may then be further processed or conveyed using a lenslet array 1112 via an optional multi-channel structure 1110 to detector array 1114. In some embodiments, there is no lens 1109 and the space between lens 1109 and image plane 1111.

Optionally, a second reflective SLM 1107 or a polarization changing mirror is provided perpendicular to SLM 1106, allowing a second, optional reference, beam to be generated by system 1100.

Figure 13:
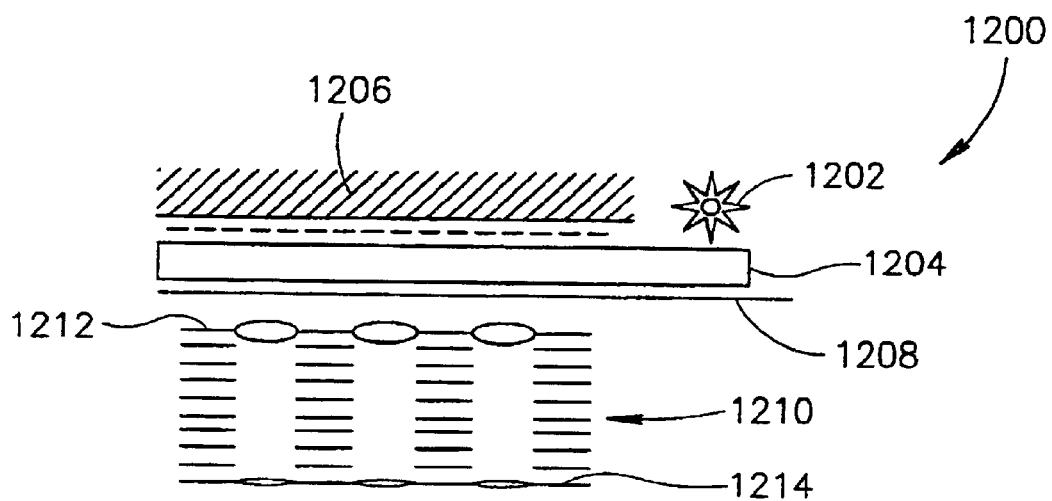
FIG. 13 is a schematic diagram of a planar reflective optical processor, in accordance with an exemplary embodiment of the invention.

FIG. 13 is a schematic diagram of a planar reflective optical processor 1200, in accordance with an exemplary embodiment of the invention. In this embodiment, the light source is a planar type light source, in which light from a source 1202 is injected into a light guide 1204 and emitted along its length. Various designs may be used for light guide 1204. In one design, the light is collimated before being injected and is allowed to leak out at various points along the length of light guide 1204, for example using a diffraction grating etched on the light guide, and is reflected using total internal reflection from the walls of light guide 1204 at other points along its length. In another design, the light is not collimated and is reflected several times until a sufficient expansion of the beam is achieved, at which point the entire beam exists from the side of the light guide. The diffraction grating may be non-uniform to control the uniformity of the exiting beam. Alternatively or additionally, the SLM, processing optics and/or detector may compensate for any non-uniformity.

The exiting light is reflected by a polarizing beam splitter 1208 towards SLM 1206, which is optionally a polarization-affecting SLM or associated with a polarizer. Splitter (or reflector, in embodiments where it does not polarize) 1208 may also serve to align the light at a desired angle relative to SLM 1206 and/or the rest of system 1200. Alternatively or additionally, the light may exit light guide 1204 only on the side near the SLM, so no reflector is necessary. The spatially modulated light then passes substantially unaffected through (traversely) light guide 1204 (or it is reflected around it) to a lenslet array 1212, which processes the modulated light and passes it though a multi-channel stricture 1210 to a detector array 1214. Alternatively, lenslet array 1212 may be inside the multi-channel structure.

Figure 14:
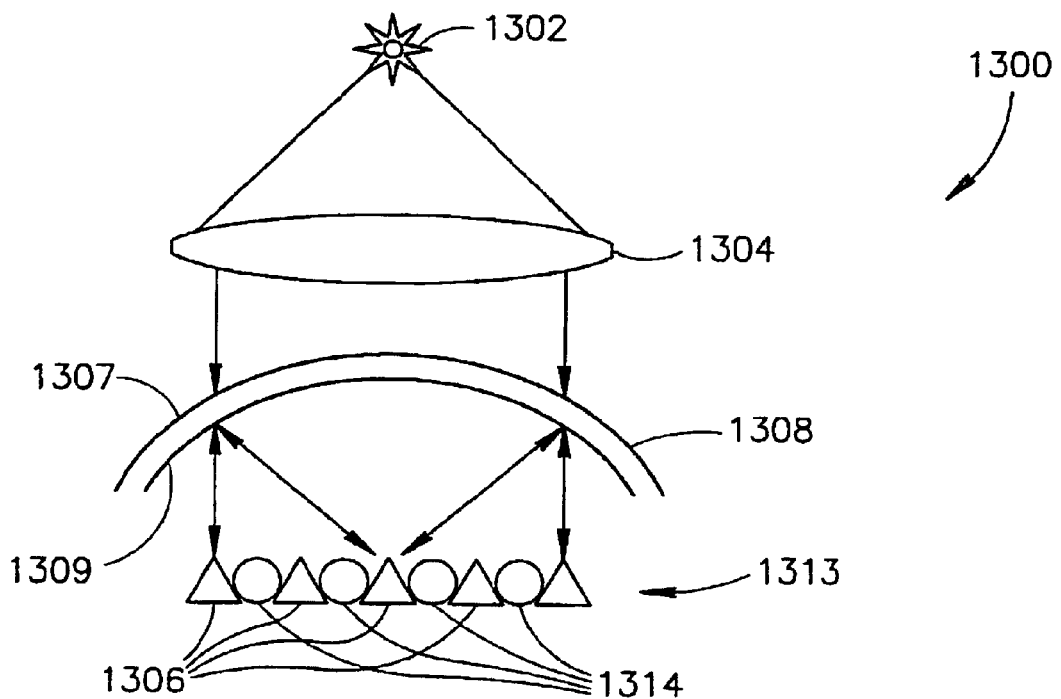
FIG. 14 is a schematic diagram of a sphere based reflective optical processor, in accordance with an exemplary embodiment of the invention.

FIG. 14 is a schematic diagram of a sphere based reflective optical processor 1300, in accordance with an exemplary embodiment of the invention. A particular feature of this embodiment is combining a processing lens, lenslet array or other optical processing element with a reflector 1308.

Light from a source 1302 is expanded (and optionally collimated) using a lens 1304. A spherical section 1308 is provided with a non-reflecting surface 1307 and an at least partially reflecting surface 1309. The light from lens 1304 passes through spherical section 1308 (or a plurality of small spherical reflectors), substantially unaffected and impinges on a combined SLM-detector element 1313. In a multi-channel device, each channel may have a separate spherical section.

In an exemplary embodiment of the invention, element 1313 is formed of an array of interspersed reflective SLM elements 1306 and detector elements 1314. These elements may be arranged in groups, but this is not required. The distribution of element types may be uniform. Alternatively, a no-uniform distribution is provided, for example, a greater density of detector may be provided at the focal point of section 1308, where greater accuracy may be required for some types of calculations. The pixels may be distributed on a Cartesian grid. Alternatively, other grids, such as a polar grid may be used. Alternatively or additionally, the pixels are not square, for example, being triangular, round or hexagonal. These variations in pixel design and distribution may depend, for example, on the type of processing to be performed using the system.

Alternatively to being reflective, SLM elements 1306 may be transmissive and source 1302 is on the other side of element 1313.

The spatially modulated light is then Fourier transformed by spherical section 1308, and reflected back toward detectors 1314. In some embodiments, a non-perfect spherical surface is used, for example a parabolic surface.

In some embodiments of the invention, an optional polarizer is added to increase the efficiency. In one embodiment, SLM elements 1306 are polarization rotating (and/or a suitable $\lambda/4$ plate is provided) and sphere 1308 only reflects suitably polarized light. Alternatively or additionally, detectors 1314 are polarizing and only accept suitably polarized light. Alternatively or additionally, lens 1304 and/or surface 1307 have a pattern formed thereon to prevent light from directly impinging on detector elements 1314.

Figure 15:
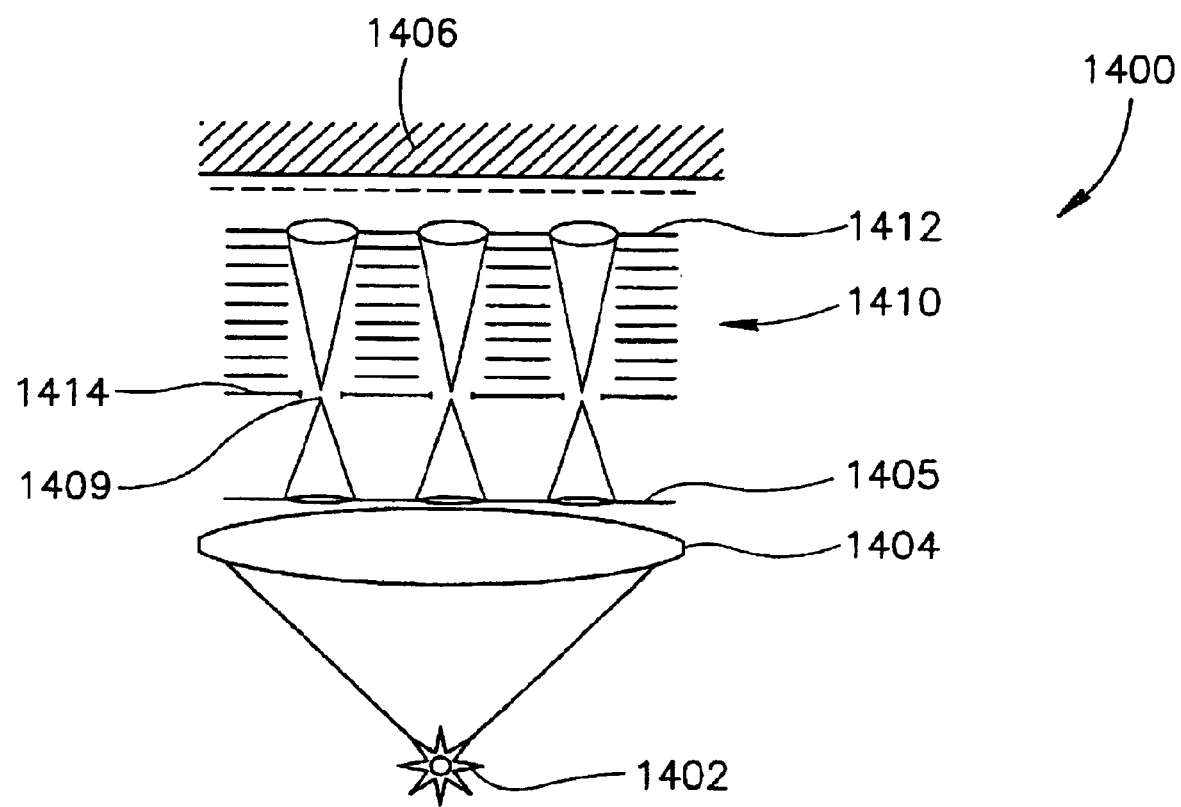
FIG. 15 is a schematic diagram of a pin-hole based reflective optical processor, in accordance with an exemplary embodiment of the invention.

FIG. 15 is a schematic diagram of a pin-hole based reflective optical processor 1400, in accordance with an exemplary embodiment of the invention. Light from a source 1402 is focused using a lens 1404 and a lens array 1405 (or other suitable optical elements) through a plurality of pinholes 1409 formed in a detector array 1414. Each pinhole optionally corresponds to a single optical channel. Alternatively to pin holes, small lens may be provided. The light from each pinhole is spatially modulated by a reflective SLM 1406 and then processed by a lenslet array 1412, to yield a desired processed light on the plane of detector 1414. As with the embodiment of FIG. 13, a polarizer may be provided. Alternatively or additionally, SLM 1406 may polarize or include a polarizer.

Alternatively to using lens and a pinhole, other configurations may be used, for example, a plurality of optical fibers. Optionally, the light is polarized.

An optional advantage of this embodiment is that no beam splitter is used.

The above description has centered on DCT based compression methods. However, other transform based compression methods may also be implemented in accordance with exemplary embodiments of the invention. In one example, a wavelet compression method is implemented using a block DWT (discrete wavelet transform). Possibly, there is an overlap between blocks. Such a transform is described, for example in G. Strang and T. Nguyen, "Wavelets and Filter Banks", Wellesly-Cambridge Press, 1997, pp. 502, the disclosure of which is incorporated herein by reference. Optionally, such a wavelet compression implementation includes bit-plane coding techniques such as SPIHT or EZW, possibly implemented using a lookup table.

The above description has centered on image compression, however, in accordance with an exemplary embodiment of the invention, optical components are used for compressing other types of signals, for example, audio signals. It is noted, however, that image compression is generally more suitable for transform based compression and being two-dimensional, is more computationally-complex to compress than other types of data.

In the above detailed description, various types of optical data representations are suggested, as well as various types of optical systems. In an exemplary embodiment of the invention, the optical representation used is selected to match the optical system, for example, an analog representation for an analog system in some cases, the data may be converted between representations, to take advantage of particular optical configurations, for example digital optical data may be converted into analog optical data to use a particular lenslet-based implementation of a DCT transforming element.

Many different types of SLMs may be used to practice various embodiments of the present invention. However, in an exemplary embodiment of the invention, a binary SLM is used for practicing the present invention or even for performing linear transforms in other applications. In an exemplary embodiment of the invention, the data is separated into bit planes and each bit plane is processed separately. Then the bit planes are combined to yield the processed result. The following equation describes the relationship between the Fourier transforming of bit-plane separated and unseparated data:

$$F\left(\sum_i 2^i \overline{a}_i\right) = \sum_i 2^i F(\overline{a}_i)$$

This equation is correct for all linear transforms. In an exemplary embodiment of the invention, the data is separated into bit-planes using an electronic circuit, however, also optical means can be used. The data may be represented in several different ways, depending on the specific application, including, spatial encoding where adjacent pixels represent different bits and temporal encoding, where the different bits are temporally separated. Combinations of temporal and spatial separations may also be used. In spatial separations, the bits may be arranged so that the MSB is surrounded by lesser significant bits, so that cross-talk between pixels (groups of bits) will be less likely to cause a modification of the MSB. An alternative binary representation uses separate optical channels (or channel portion) for the different bit planes.

After processing, the processed bit planes may be combined using optical or electronic means. The optical means may be analog or digital. One example of an optical combining means is using a weighted mask which reduces the intensity of light from each bit plane response to the bit position and then all the light is directed to a single CCD pixel. Another example of combining is having each bit illuminate a different CCD pixel and then performing weighted addition on the pixels. Alternatively or additionally, different bit planes may be generated with different intensity values depending on the bit position.

It is contemplated that the use of a binary SLM may be advantageous also for other application using optical processing, for example radar signal processing. By using high speed modulation of parallel data beams, a higher system clock can be provided, possibly even providing a better throughput than electronic processors of a similar size, cost and/or heat dissipation.

Alternatively to a two-level SLM, three-or higher numbers of discrete levels may be provided at the SLM. Alternatively or additionally, although a radix based separation and combination of data is described, other methods can be used to separate the data and recombine it. In one example, a set of optionally orthogonal basis vectors are used to separate the data and recombine it. Such a set of basis vectors may be arbitrary. Alternatively, it may be designed for other reasons, for example, for noise reduction, for distributing noise evenly between bits and/or for matching the basis vector set to a system characteristic, such as a system MTF.

In some cases, the SLM is faster than the propagation time in the processor. Optionally, the processor is treated as a pipe-line in which the SLM and detector are not processing the same data, but rather there is a delay between the SLM and the CCD. Multiple data streams may also be utilized using different frequencies of light. In some cases, either the SLM or the CCD will be faster. Optionally, several instances of the slower element are provided in order not to slow the pipeline. Light from a plurality of SLMs can be collimated to a single optical path and, conversely, light from a single optical path can be projected or copied to a plurality of CCDs. Such mixing and copying is especially useful when different data streams are implemented using different frequencies of light. However, such frequencies may also be differentiated using an active optical filter such as an LCD-color filter-polarizer combination.

The optical processing hardware is optionally dedicated for particular tasks. Alternatively, in some embodiments of the invention, the same hardware components may be used for different steps in a process (such as a DCT component for compression and for motion estimation), for different processes (such as compression and decompression) and/or for different data blocks in a same process, such as in serial processing of data blocks). Alternatively or additionally, the hardware may be programmable, at least to some extent. For example, by modifying the behavior of an SLM and a CCD which form part of a Fourier-based data transform optical component, different type of transforms can be achieved with a single hardware, for example, DCT and DST. Alternatively or additionally, the matching layer may be programmable, for example being an addressable LCD, so that the size and/or location of pinholes can be controlled. Alternatively or additionally, by controlling the opacity of single LCD cells, different continuous spatial filtering configurations can be achieved.

In some embodiments of the invention, the above transforming of data or other processing of data are performed using other optical and electro-optical effects, for example bi-refringent calcite crystals as used in switching networks. Such crystals and exemplary uses are described, for example in "All-Optical Reduced State 4×4 switch", by Dan. M. Marom and David Mendlovic *Optics and Photonics News* March 1996, p. 43, in "Optical Array Generation and Interconnection Using Birefringent Slabs", Tomas W. Stone and James M. Battiato, *Applied Optics*, Vol. 33 No. 2, pp. 182–191 January 1994 and in "Cantor Network, Control Algorithm, Two-Dimensional Compact Structure and its Optical Implementation", by Ning Wang, Liren Liu and Yaozu Yin, *Applied Optics*, Vol. 34 No. 35 P. 8176–8182, December 1995, the disclosures of which are incorporated herein by reference.

Figure 9B:
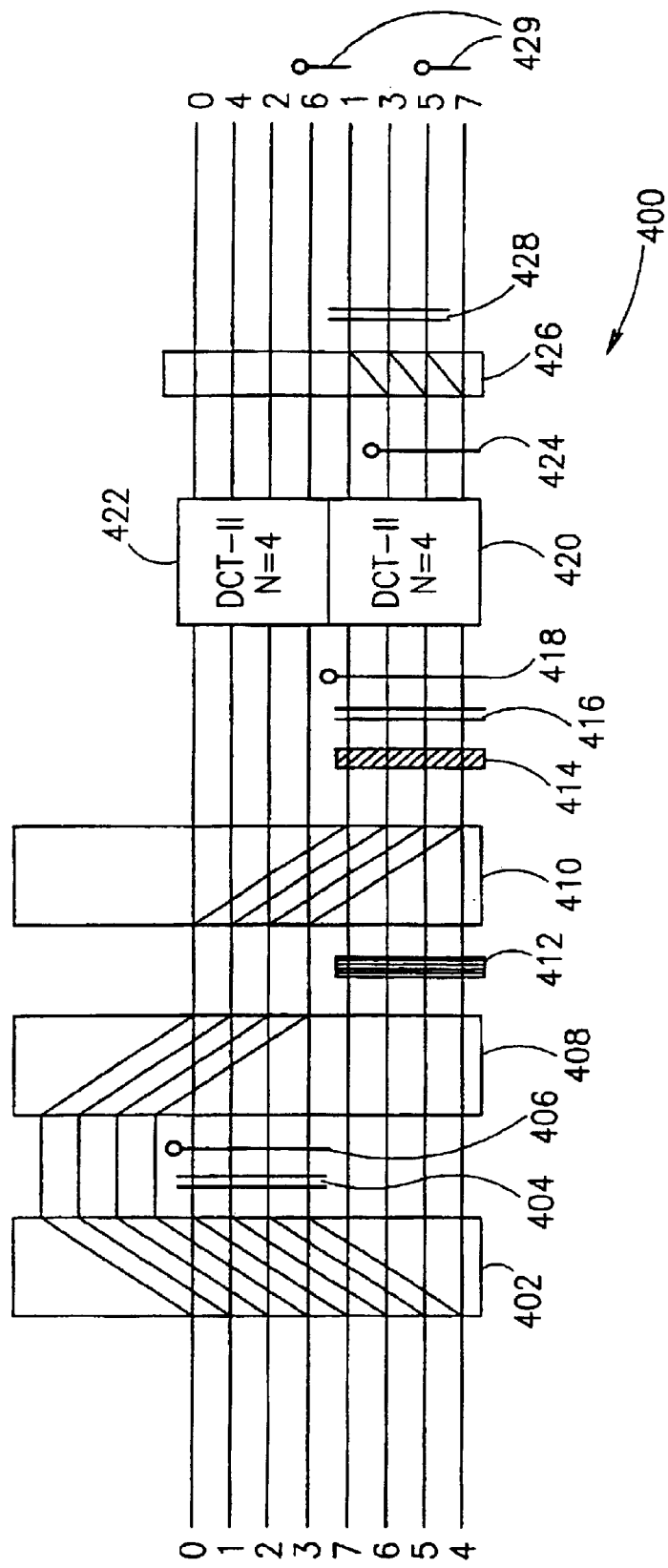
FIG. 9B is a schematic figure of a calcite based DCT transforming optical element, in accordance with an exemplary embodiment of the invention.
Figure 10:
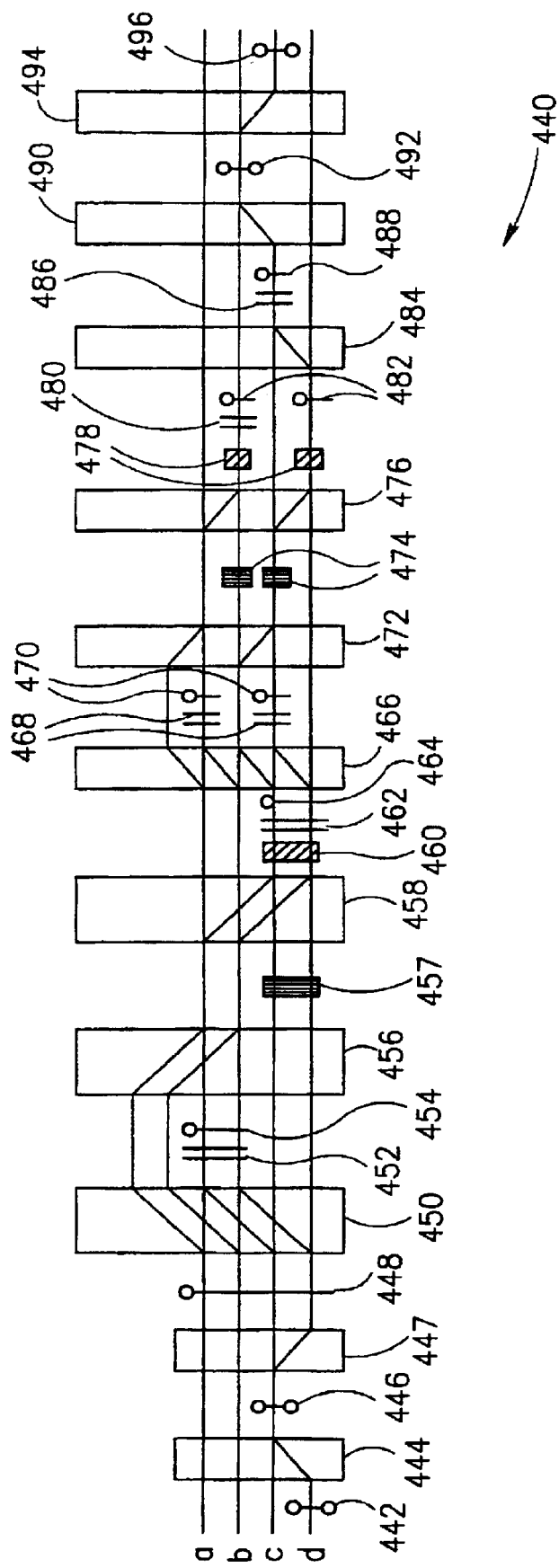
FIG. 10 is a schematic figure of a detail of FIG. 9B.

In one exemplary embodiment of the invention, an optical processing component is designed to implement a DCT algorithm by simple manipulations of light, such as splitting, adding, subtracting and/or multiplying by various factors. DIF (decimation in frequency) or a DIT (decimation in time) algorithm are considered to be especially suitable in accordance with an exemplary embodiment of the invention. However, many other algorithms are known for calculating a DCT and may be implemented in accordance with other exemplary embodiments of the present invention. FIGS. 9B and 10 describe an implementation using calcite crystals, attenuators, phase retarders and polarizers to achieve these effects. However, other optical elements may be used instead, for example diffractive optics.

Figure 9A:
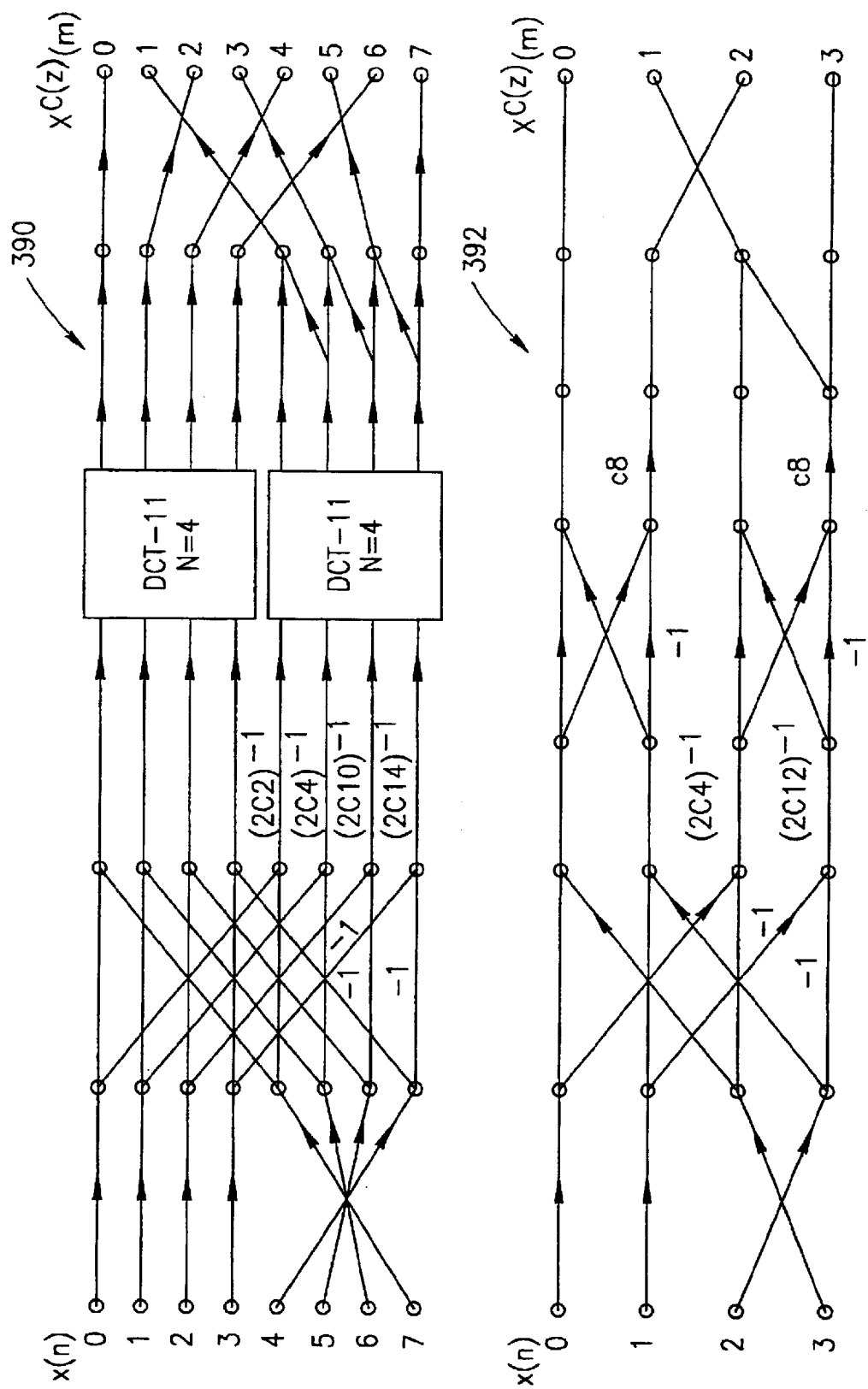
FIG. 9A is a flowchart for a DIF (decimation in time) type of DCT computation.

FIG. 9A is a flowgraph for performing a 8×1 DCT-II using a DIF type algorithm. In the DIF and DIT representations, the input data points are rearranged so into groups, each of which can be recursively evaluated using a lower-order DIF or DIT algorithm Reference 390 is a 8×1 DCT which uses two 4×1 DCT components, indicated by a reference 392. A copy of this figure can be found in "DCT-applications and Algorithms" by P. Yip and K. R. Rao (Academic Press, 1990), page 61, the associated discussion (pp. 56–61) being incorporated herein by reference. FIGS. 9B and 10 illustrate one possible implementation of these flowgraphs. It is noted that due to the differences between optical elements and line diagrams, in some cases single operations are spread out between several optical components or plural operations are combined in a single optical component. Also, although the example shown is of a DCT process, similar embodiments may be used for DFT (discrete Fourier transform) and for DWT (discrete wavelet transform).

FIG. 9B is a schematic figure of a calcite based DCT transforming optical element 400, in accordance with an exemplary embodiment of the invention. Eight beams or circularly polarized light, each representing one pixel of an 8 pixel vector are split into two sets of beams by a first calcite crystal 402. One set of beams "ordinary rays" comprise the light that is polarized at 0° to the calcite polarization axis. The other beams, "extraordinary rays" comprise light polarized at 90° to the axis. It should be noted that as the beams are processed, they stop corresponding to the original pixels, however, for convenience, the separate beams of light are referred to in the order in which they are shown in the figure. It should be noted that in some cases, fewer or more beams may be active during the DCT processing stage, even if both the input and the output are for eight rays of light. Four of the split beams (pixels 4–7) are recombined with the other four beams (pixels 0–3) and then polarized by a linear polarizer 404 at 45° and converted into zero axis polarized light by a λ/4 plate 406. This completes a parallel shift and addition operation on all the pixels. These beams are then spatial recombined with the original beams for pixels 0–3 using a second calcite crystal 408. However, two polarizations are transmitted by crystal 408, the 90° light being further shifted by the following crystal (410). A third calcite crystal 410 is used to combine the beams of pixels 0–3 with phase delayed beams of pixels 4–7, which pixel beams are retarded using a λ/2 phase plate 412. The result of the combination is attenuated using an attenuator 414, polarized using a polarizer 416 and then converted into circularly polarized light using a λ/4 plate 418. Each of pixel sets 0–3 and 4–7 are then processed using a DCT-II 4 bit element 420 or 422, described in FIG. 10.

The output of elements 420 and 422 are further processed to yield the final DCT. Beams 4–6 are retarded using a λ/4 retarding plate 424 and then combined with beams 5–7, using a fourth calcite crystal 426. Beams 5–7 then sum up their two polarizations using a 45° polarizer 428, to yield the DCT result in eight beams.

Typically, but not necessarily, a 2D DCT is desirable. One way of generating a 2D DCT is to apply a DCT to the rows and then process the result by columns. This can be achieved, for example, by chaining two system 400, where one is perpendicular to the other, thus performing first row transforms and then column transforms. Phase information is maintained by the light, so there is no need for separate circuitry to support chaining two DCT elements. A λ/4 retarder 429 is optionally provided on beams 5–7 of the first system 400, to support the chaining.

In an exemplary embodiment of the invention, the system is implemented as a 2×4 array, rather than as a 1×8 array. In one calculated embodiment the system is about 27 times as long as the width of each of the calcite crystals. It is noted that the input and output are not in pixels order. In an exemplary embodiment of the invention, the pixel order is generated by suitable wiring of the SLM or of the CCD. In a 2×4 folded embodiment, the required length is calculated to be 18 times the width. It should be noted that the required length can vary by a significant factor depending on engineering considerations, such as materials, folded optical paths and noise considerations.

FIG. 10 is a schematic figure of a 4 pixel DCT element 440, such as elements 420 and 422 of FIG. 9B. Letter indications a–d are used to avoid mix-up with pixel beams 0–7 of FIG. 9B. Again it is noted that as beams a–d are processed, they loose their original meaning and are simply used to designate the ordinal location of the beam in the figure. Beam d is retarded using a $\lambda/2$ retarder 442, then beam c is combined with beam d using a calcite crystal 444. The resulting beam c is retarded again using a $\lambda/2$ retarded 447 and then split into beam c and beam d using a second calcite crystal 447. Thus, the data in beams c and d is exchanged. A $\lambda/4$ retarder 448 is applied to all the beams, converting them to 45° polarization. Beams c and d are combined with beams a and b using a calcite crystal 450, thus implementing addition operations a+c and b+d. The resulting beams a and b are then combined with the original beams a and b, using a calcite crystal 456, after the result beams being first polarized using a polarizer 452 and then retarded using a $\lambda/4$ plate 454. Beams c and d are delayed using a phase plate 457 and then have beams a and b combined with them, using a calcite crystal 458. This completes a subtraction operation between the original beams—a–d and b–c. The resulting beams c and d are attenuated using an attenuator 460, polarized using a polarizer 462 and retarded using a $\lambda/4$ retarder 464. Beams b-d are then combined with beams a-c, using a calcite crystal 466.

At this point in the process, each pair of beams is processed to yield a 2 input DCT. Beams a and c are polarized using a polarizer 468 and retarded using a $\lambda/4$ retarder 470. A calcite 472 combines the pre-466 crystal a beam with the current a beam and spatially combines the b beam with the current c beam, although they do not have the same polarization and are separated by the next calcite. Beams b and d are delayed using a phase plate 474. A calcite 476 combines beams a and c into beams b and d. Beams b and d are attenuated using an attenuator 478, beam b is polarized using a polarizer 480 and then beams b and d are retarded using a $\lambda/4$ retarder 482. A calcite crystal 484 is used to combine beam d into beam c. The resulting beam c is polarized using a polarizer 486 and is retarded using a $\lambda/4$ retarder 488. A calcite crystal 490 spatially combines beam c into beam b. A $\lambda/2$ retarder 492 retards beam b and a calcite crystal 494 splits out the pre-490 beam c. Elements 490–492 are used to exchange the polarization states of beams b and c. Beam c is then retarded using a $\lambda/2$ retarded 496, generating the DCT result.

The description of FIGS. 9B and 10 have focused on non-programmable embodiments. However, it should be noted that bi-refringent switching networks usually include active elements, which allow outside control of their behavior. An example of such an element is a liquid crystal cell which can selectively (on the application of an electric field) rotate the polarization of a light ray. Another example is a beam switching element which selectively swaps two beams. In some embodiments of the invention, such controllable active elements are used to allow programming of the device, however, in other embodiments this is not required. Programming is especially useful for allowing a single component to function in different ways for example for different image portions, for compression or decompressing and/or for different steps of processing.

The present application is related to the following four PCT applications filed on same date as the instant application in the IL receiving office, by applicant JTC2000 development (Delaware), Inc.: PCT Application No. PCT/IL00/00283 now U.S. Ser. No. 09/979,183, which especially describes various optical processor designs; PCT Application No. PCT/IL00/00286 now U.S. Ser. No. 09/979,184, which especially describes data processing using separation into bit planes and/or using feedback; PCT Application No. PCT/IL00/00284 now U.S. Ser. No. 09/979,182, which especially describes a method of optical sign extraction and representation; PCT Application No. PCT/IL00/00282 now U.S. Ser. No. 09/979,178, which especially describes a method of matching of discrete and continuous optical components. The disclosures of all of these applications are incorporated herein by reference.

It will be appreciated that the above described methods and apparatus for optical processing may be varied in many ways, including, changing the order of steps, which steps are performed using electrical components and which steps are performed using optical components, the representation of the data and/or the hardware design. In addition, various distributed and/or centralized hardware configurations may be used to implement the above invention. In addition, a multiplicity of various features, both of methods and of devices, have been described. It should be appreciated that different features may be combined in different ways. In particular, not all the features shown above in a particular embodiment are necessary in every similar embodiment of the invention. Further, combinations of the above features are also considered to be within the scope of some embodiments of the invention. In addition, the scope of the invention includes methods of using, constructing, calibrating and/or maintaining the apparatus described herein. When used in the following claims, the terms "comprises", "comprising", "includes", "including" or the like mean "including but not limited to".

What is claimed is:

1. A method of separating optical channels in a multi-channel optical system comprising:
    optically processing a plurality of spatially adjacent channels, using a common optical element, to have spatially overlapping output areas;
    detecting a result of said optical processing on an image plane; and
    deriving a processing result of a single channel of said plurality of channels by subtracting a subtrahend indicating an effect of the overlapping output areas from a quantity indicating said detected result.

2. A method according to claim 1, wherein said optical element comprises a lens.

3. A method according to claim 2, wherein said plurality of adjacent channels comprises a set of 3×3 channels.

4. A method according to claim 1, wherein optically processing the plurality of spatially adjacent channels comprises passing at least some of the optical channels through respective spatially shifting elements, to spatially shift said detected result on said image plane.

5. A method according to claim 4, wherein said spatially shifting elements comprise prisms.

6. A method according to claim 5, wherein a prism is not associated with a central channel in a spatial arrangement of said plurality of channels.

* * * * *